(12) United States Patent
Faber et al.

(10) Patent No.: US 9,205,853 B2
(45) Date of Patent: Dec. 8, 2015

(54) BOX WITH A WHEEL ASSEMBLY AND A TOW STRAP

(71) Applicant: INTERNATIONAL PAPER COMPANY, Memphis, TN (US)

(72) Inventors: Richard D Faber, Memphis, TN (US); Kenneth Buss, Collierville, TN (US); Alex D Bevier, Olive Branch, MS (US); Brian K Jambois, Little Elm, TX (US)

(73) Assignee: INTERNATIONAL PAPER COMPANY, Memphis, TN (US)

( * ) Notice: Subject to any disclaimer, the term of this patent is extended or adjusted under 35 U.S.C. 154(b) by 0 days.

(21) Appl. No.: 14/185,001

(22) Filed: Feb. 20, 2014

(65) Prior Publication Data

US 2014/0284893 A1    Sep. 25, 2014

Related U.S. Application Data

(63) Continuation of application No. PCT/US2013/026383, filed on Feb. 15, 2013.

(60) Provisional application No. 61/724,457, filed on Nov. 9, 2012, provisional application No. 61/599,600, filed on Feb. 16, 2012.

(51) Int. Cl.
*B62B 3/00* (2006.01)
*B62B 3/14* (2006.01)
*B62B 3/10* (2006.01)
*B65D 5/468* (2006.01)
*B42F 7/14* (2006.01)
(Continued)

(52) U.S. Cl.
CPC . *B62B 3/108* (2013.01); *B42F 7/14* (2013.01); *B62B 3/005* (2013.01); *B62B 3/006* (2013.01); *B62B 3/1476* (2013.01); *B65D 5/4208* (2013.01); *B65D 5/4608* (2013.01); *B65D 5/48024* (2013.01); *B62B 2202/12* (2013.01)

(58) Field of Classification Search
USPC ........ 280/33.998, 47.34, 79.11, 79.2, DIG. 3; 16/24, 43, 425, 427, 428
See application file for complete search history.

(56) References Cited

U.S. PATENT DOCUMENTS 1,199,790 A    10/1916    Holcomb
1,647,581 A    11/1927    Redemski
(Continued)

FOREIGN PATENT DOCUMENTS

AT    008447    8/2006
DE    2733390    2/1979
(Continued)

*Primary Examiner* — Frank Vanaman
(74) *Attorney, Agent, or Firm* — Thomas W. Barnes, III

(57) ABSTRACT

A box with a wheel assembly platform has a tow strap with a folded position stowed in a recess in the platform and an unfolded position accessible outside the box. In one embodiment, the strap is incorporated in a pre-assembled handle pack positioned in the recess. The strap may be retracted by a torsion spring, and may be coiled in the pack by use of a rotating fork. In one embodiment axles projecting from rollers are supported in recesses formed in the platform, and in another embodiment the axles are supported in notches in the bottom end of cylinders mounted in cutouts in the platform. In a further embodiment a box has hand holes in opposite walls with a spacer panel providing finger access behind the holes. The platform may have hinged panels. A thermoformed skin may be applied to the platform or constitute the platform.

124 Claims, 33 Drawing Sheets

(51) Int. Cl.
*B65D 5/49* (2006.01)
*B65D 5/42* (2006.01)

(56) References Cited

U.S. PATENT DOCUMENTS

| | | | |
|---|---|---|---|
| 2,257,977 A | 10/1941 | Richard | |
| 2,716,558 A * | 8/1955 | Sullivan | 280/651 |
| 2,805,077 A | 9/1957 | Katz | |
| 2,942,771 A | 6/1960 | Spigelman | |
| 2,961,143 A | 11/1960 | Ferrer | |
| 3,042,461 A * | 7/1962 | Smith | 384/440 |
| 3,086,690 A | 4/1963 | Beck | |
| 3,135,527 A | 6/1964 | Knapp | |
| 3,157,342 A | 11/1964 | Grady | |
| 3,198,300 A | 8/1965 | Tuttle | |
| 3,302,955 A * | 2/1967 | Witzgall | 280/79.2 |
| 3,337,285 A | 8/1967 | Travis | |
| 3,438,480 A | 4/1969 | Chabrelot | |
| 3,487,479 A | 1/1970 | Grooms | |
| 3,492,016 A | 1/1970 | O'Connor et al. | |
| 3,593,387 A | 7/1971 | Georgi | |
| 3,653,577 A | 4/1972 | Wyner | |
| 3,680,810 A | 8/1972 | Jarmalow | |
| 3,794,239 A | 2/1974 | Bonczyk | |
| 3,853,285 A | 12/1974 | Woodring | |
| 3,954,226 A | 5/1976 | Pickering | |
| 3,982,613 A | 9/1976 | Wood | |
| 4,058,250 A | 11/1977 | Akkerman | |
| 4,060,252 A | 11/1977 | Mowery | |
| 4,068,779 A * | 1/1978 | Canfield | 220/754 |
| 4,128,253 A * | 12/1978 | Powers | 280/79.11 |
| 4,143,803 A | 3/1979 | Taylor | |
| 4,166,570 A | 9/1979 | Lazerand et al. | |
| 4,286,714 A | 9/1981 | Zdarsky et al. | |
| 4,311,288 A | 1/1982 | Galland | |
| 4,416,429 A | 11/1983 | Jessamine | |
| 4,583,681 A | 4/1986 | Neese | |
| 4,772,035 A | 9/1988 | Danial | |
| 4,940,252 A | 7/1990 | Seib | |
| 4,969,610 A | 11/1990 | Taylor et al. | |
| 5,106,015 A | 4/1992 | Vlasaty et al. | |
| 5,111,952 A | 5/1992 | Stocchiero | |
| 5,284,247 A | 2/1994 | Turner | |
| 5,316,210 A | 5/1994 | Scullin | |
| 5,356,031 A * | 10/1994 | Jondelius | 220/610 |
| 5,403,023 A * | 4/1995 | Tsai | 280/42 |
| 5,419,009 A | 5/1995 | Assis et al. | |
| 5,445,396 A * | 8/1995 | Sebor | 280/33.998 |
| 5,467,915 A | 11/1995 | Mattson | |
| 5,551,715 A * | 9/1996 | Pickard | 280/43.24 |
| 5,709,008 A | 1/1998 | Dickinson | |
| 5,898,472 A | 4/1999 | Oshikawa | |
| 5,927,450 A | 7/1999 | Sadow | |
| 6,199,879 B1 | 3/2001 | Cino et al. | |
| 6,244,502 B1 | 6/2001 | Hollar et al. | |
| 6,979,005 B1 | 12/2005 | McLerran | |
| 6,983,946 B2 | 1/2006 | Sullivan et al. | |
| 7,249,729 B2 | 7/2007 | Moritz | |
| 7,431,235 B2 | 10/2008 | Moritz | |
| 7,743,969 B2 | 6/2010 | Bokel | |
| 7,845,894 B2 | 12/2010 | Dickinson et al. | |
| 8,032,986 B2 | 10/2011 | Lawrence | |
| 8,205,399 B2 * | 6/2012 | Ralston | 52/143 |
| 2001/0038778 A1 | 11/2001 | Tatina | |
| 2005/0006861 A1 | 1/2005 | Dubois et al. | |
| 2005/0269791 A1 | 12/2005 | Hoiriis et al. | |
| 2010/0001054 A1 | 1/2010 | Brittain | |
| 2010/0147642 A1 | 6/2010 | Andochick | |
| 2012/0223129 A1 | 9/2012 | Oppenheimer | |
| 2013/0313136 A1 | 11/2013 | Faber et al. | |
| 2014/0061080 A1 | 3/2014 | Faber et al. | |

FOREIGN PATENT DOCUMENTS

| | | |
|---|---|---|
| DE | 20202320 | 5/2002 |
| DE | 20316226 | 3/2004 |
| EP | 0009921 | 4/1980 |
| EP | 0410772 | 1/1991 |
| EP | 0519366 | 12/1992 |
| EP | 1375362 | 1/2004 |
| FR | 2501635 | 9/1982 |
| FR | 2741852 | 11/1995 |
| FR | 2865446 | 1/2004 |
| FR | 2898341 | 9/2007 |
| GB | 372119 | 5/1932 |
| GB | 1480726 | 7/1977 |
| GB | 2471309 | 12/2010 |
| KR | 20100007403 | 7/2010 |
| WO | 9419642 | 9/1994 |
| WO | 2009027992 | 3/2009 |
| WO | 2009046775 | 4/2009 |
| WO | 2010033029 | 3/2010 |

* cited by examiner

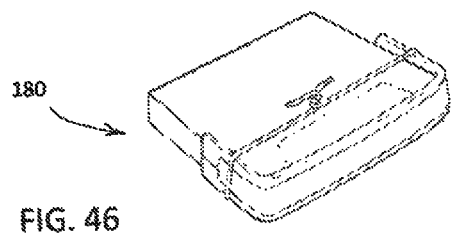
FIG. 46
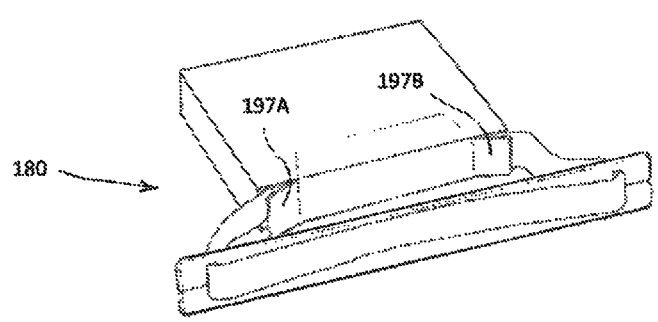
FIG. 47
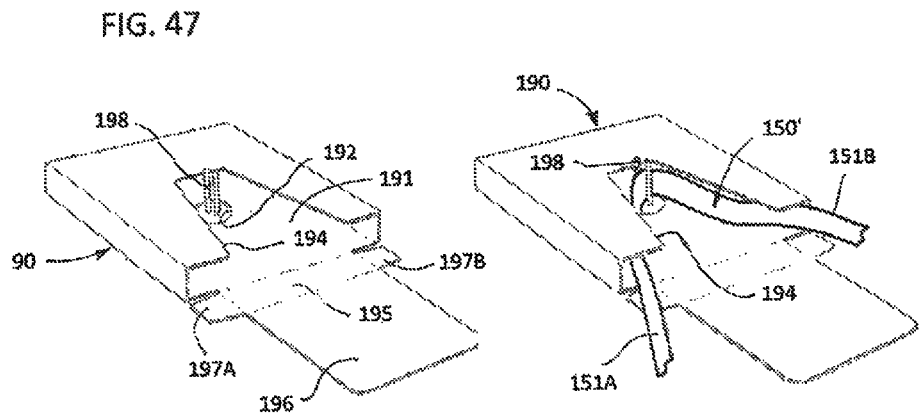
FIG. 48
FIG. 49

1

BOX WITH A WHEEL ASSEMBLY AND A TOW STRAP

FIELD OF THE INVENTION

This invention relates generally to boxes. One aspect of the invention relates to boxes having a wheel assembly and a tow strap for attachment to the box to pull it along a surface. Another aspect of the invention relates to a box having hand holes and a spacer panel defining recesses behind the hand holes for insertion of the fingers to facilitate lifting and carrying of the box. In a specific embodiment the box is a carton designed to hold multiple reams of cut sheets of paper.

BACKGROUND ART

Conventional boxes and cartons do not have a wheel assembly associated with them and normally are picked up and carried by placing the hands under the bottom of the box or carton. Conventional cartons designed for holding cut sheets of paper are formed of corrugated cardboard and typically hold 10 wrapped reams of 500 sheets each. These cartons of paper weigh 50 pounds or more, depending upon the bond rating of the paper. For example, a single ream of standard 20 lb. bond paper weighs 5 pounds and a single ream of 24 lb. bond paper weighs 6 pounds, whereby a carton of 10 reams of 20 lb. bond paper weighs 50 pounds and a carton of 10 reams of 24 lb. bond paper weighs 60 pounds. These boxes are relatively heavy and difficult to handle by most consumers.

Some conventional boxes and cartons have hand holes in opposed walls to facilitate lifting and carrying of them, but there is no spacer panel defining recesses behind the hand holes to provide space for insertion of the fingers through the hand holes. Cartons holding cut sheets of paper normally do not have hand holes in them.

Consumers wishing to purchase one or more cartons of paper typically either order the paper to be delivered to their home or office location, or go to a point of sale to acquire the paper. In the former instance, even after the carton has been delivered to their location, the consumer generally either has to lift the carton of paper and carry it to its point of use, or lift the carton onto a cart for transport to the point of use and then again lift the carton to remove it from the cart. In the latter instance, when the consumer drives to a point of sale to acquire the paper, the consumer either has to lift and carry the carton to check-out, or select a shopping cart and push the cart to where the cartons of paper are displayed, then lift the carton into the cart and push the cart to check-out. After purchase, the consumer again has to lift the carton of paper to remove it from the cart and place it in his or her vehicle. Upon reaching their destination, the consumer again has to lift the carton to remove it from the vehicle and either carry the carton into his or her home or office or place it on a cart to transport it to its point of use. This multiple lifting of the relatively heavy cartons of paper from a variety of carts, dollies and shopping carts increases the possibility for personal injury to the consumer.

SUMMARY OF THE INVENTION

In a preferred embodiment the box of the invention comprises a standard corrugated paper carton having a bottom wall, opposite side walls, opposite end walls, and a removable lid or cover, and is designed to hold 10 reams of paper, but it should be understood that the principles of the invention could be applied to containers made of other materials and having other capacities and designed for other goods. The carton of the invention differs from conventional cartons in that a wheel assembly is mounted to the carton bottom and a towing strap or lanyard is provided so that a consumer can place the carton on a supporting surface and easily pull the carton along without having to lift and carry the carton as required with conventional cartons.

In one construction, the bottom wall of the carton of the invention has cutouts formed in it, and a wheel assembly is positioned in the bottom of the carton with rollers or wheels projecting downwardly through the cutouts to support the bottom of the carton above a supporting surface so that the carton may be easily moved along the surface. At least one tow strap or lanyard is stowed in the bottom of the carton. When it is desired to move the carton along a supporting surface the strap may be pulled out through one end or side of the carton to enable it to be comfortably used by a consumer standing upright to pull the carton along on the rollers. Because of the attachment of the strap at the bottom of the carton, preferably at one end thereof, it can be used to slightly lift the end of the carton to facilitate moving it over small obstacles such as uneven pavement, cracks in a sidewalk, and the like.

Although the wheel assembly as illustrated and described herein is mounted on the inside of the box bottom, it could be mounted on the outside beneath the box bottom, whereby the need for cutouts in the bottom of the box to accommodate the rollers and a cutout at the bottom edge of an end wall to accommodate the handle would be eliminated.

In a first preferred embodiment, the wheel assembly comprises a roller support platform with cutouts therein supporting a plurality of rollers. The rollers project downwardly from an underside of the platform so that they project through the cutouts in the bottom wall of the carton. A wheel assembly upper pad is placed on top of the roller support platform to protect the cut sheets of paper placed in the carton from damage due to the cutouts that house the rollers, and a wheel assembly lower pad is placed between the roller support platform and the bottom wall of the carton to strengthen the bottom and aid in holding the rollers in place. The carton lid or cover top wall preferably has a plurality of recesses or dimples formed in it in positions corresponding to the positions of the rollers projecting from the bottom of the carton so that when the cartons are stacked on top of one another the rollers of an upper carton are received in the recesses of a lower carton and the bottom wall of an upper carton rests on the top of the cover of a lower carton, thereby enabling the cartons to be stably stacked and protecting the rollers in lower cartons from damage due to the weight of other cartons stacked thereon. To accommodate the dimples, the cover may have a thickened top wall or a separate cover panel may be placed against the underside of the cover top wall. A padded handle preferably is provided on the tow strap to enhance comfort of use. The handle is designed to fit snugly in and substantially fill and close the cutout in the carton end wall when the strap and handle are in their stowed position.

In that form of the invention using only a single tow strap, the tow strap preferably is formed as a closed loop, and in one embodiment an inner end thereof is accordion-folded and stowed in a cutout in the roller support platform. In another embodiment the tow strap is assembled to a separate strap cartridge that is held in a cutout in the roller support platform. It is within the purview of the present invention that the tow strap could comprise a single strap rather than a closed loop, with an inner end of the strap appropriately folded and attached to the roller support platform, and, if desired, a handle attached to the outer end.

In a further preferred construction, the roller support platform is made of corrugated paper and the rollers are formed of hardened paper to facilitate recycling, although they may be made of other suitable materials such as wood or plastic, for example. Similarly, although the upper and lower pads are preferably formed of paperboard, they may be formed of other suitable materials, such as fiberboard, for example.

In a second preferred embodiment of the invention, the wheel assembly comprises a platform panel of Hexacomb® D/C, core type 1, with heavy facings, available from Pregis Corporation of Lake Forest, Ill., and commonly used as a packing material. Cutouts are formed through the platform for accommodating roller means comprising roller balls or wheels mounted in short, rigid, roller support cylinders glued in the cutouts. Short axles projecting from opposite sides of the roller balls or wheels are received in notches cut in a bottom end of the support cylinders so that the balls or wheels protrude from that end but are spaced from the opposite end of the respective cylinders.

In that form of the invention using two tow straps, with one being accessible at one side or end of the carton and the other being accessible at an opposite side or end of the carton, the tow straps are preferably formed as a single continuous loop, although the two tow straps could be separate from one another. A pair of spaced parallel channels is formed in the top surface of the Hexacomb® platform, extending inwardly from respective opposite edges of the platform and terminating at their inner ends in pockets approximately midway between the opposite edges. The loop is positioned in the channels, with opposite outer ends thereof normally stowed at respective opposite edges of the platform. A handle pad may be provided on the outer ends of the respective ends of the loop, and a shallow recess preferably is formed in the adjacent edge of the platform for stowing the handle so that it is substantially flush with the outer surface of the carton. The loop is a predetermined distance longer than the platform and the excess central portions of the loop are accordion-folded and stowed in respective pockets.

A single tow strap may be used in the second preferred embodiment of the invention rather than the two tow straps as described above and may either have the inner end thereof accordion-folded and stowed in a cutout in the Hexacomb® platform, or assembled to a separate strap cartridge that is held in a cutout in the platform similarly to the arrangement in the first preferred embodiment.

The tow strap or lanyard in either form of the invention can comprise a length of the plastic strapping that is commonly used to secure the lid or cover on the cartons, although it can be formed of any suitable material having sufficient strength and flexibility.

In a preferred embodiment of the invention the tow strap is connected with a torsion spring and is retractable when not in use. In a particular embodiment of retractable tow strap, the tow strap is wound on a spool and twisted elastic members connected with the spool comprise the torsion spring.

In a further preferred embodiment of the invention the wheel assembly platform comprises a main panel and two half panels hinged to respective opposite sides of the main panel. When the half panels are folded inwardly over the main panel they serve to retain the spool, elastic members, and tow strap in cut-outs in the main panel.

In yet another preferred embodiment, the wheel assembly platform comprises a panel of honeycomb material with a thermoformed skin applied to its underside. Wheels having short axles projecting from opposite sides thereof are mounted to the panel, with the axles frictionally retained in undercut portions of the thermoformed skin.

In a still further embodiment the wheel assembly platform comprises a thermoformed panel having a thickness to accommodate the wheels, and a separate panel of honeycomb or other material is omitted.

Accessories to the carton of the invention include a dimpled pallet blanket that may be provided for placement on a pallet to receive the protruding rollers extending from the bottom of the lowermost cartons placed on the pallet so that the bottom walls of the cartons rest on the pallet blanket, protecting the rollers next to the pallet from damage due to the force that would otherwise be exerted on them by the stacked and strapped cartons on the pallet. The pallet blanket also stabilizes the placement of the cartons on the pallet.

Additionally, a dimpled shelf pad may be provided for stably supporting the cartons on a shelf at a point of sale.

Preferably, all components of the carton except the tow strap are made of a paper material and can be single streamed into the old corrugated container (OCC) reclamation process.

According to a preferred embodiment, the carton of the invention is manufactured according to conventional methods, except that roller-receiving cutouts are formed in its bottom wall and a handle-receiving cutout is formed in one end wall. The wheel assembly is produced by making cutouts and recesses in the underside of the roller support platform for receiving the rollers, and channels for receiving the tow strap. The rollers, which in a preferred construction comprise hardened paper balls with stick paper axles projecting from opposite sides thereof, are positioned in the cutouts and recesses for receiving them, and the tow strap is appropriately folded and placed in the channels for receiving it, with the handle attached to the tow strap lying against the edge of the platform. The wheel assembly lower pad is glued to the bottom surface of the roller support platform to help hold the rollers and tow strap in their respective cutouts, recesses and channels, and the wheel assembly upper pad is glued to the top surface of the roller support platform. The completed wheel assembly is then positioned on the bottom wall-forming panel of a flattened carton, and the flattened carton with the wheel assembly attached to it is shipped to a facility where it may be erected and cut sheets of paper placed in it according to conventional methods.

In another preferred embodiment, the wheeled carton of the invention has hand holes in its opposite ends and a spacer panel with cut outs in its opposite ends is inserted between the reams of paper with the cut outs positioned in registry with the hand holes to provide clearance for the fingers when they are inserted through the hand holes. The fingers then engage beneath superjacent reams of paper to exert force against the paper to lift the carton.

In a still further preferred embodiment, the wheel assembly is omitted and a carton is provided with the hand holes and spacer panel insert to facilitate lifting of the carton.

Although the carton has been described as holding 10 reams of paper, it should be understood that the invention is applicable to cartons holding a different number of cut sheets of paper, or to cartons for holding other objects and which have a weight that makes them difficult to handle in a conventional manner.

Further, it is contemplated that the wheel assembly and/or the handle pack could be a separate item of commerce, manufactured and sold separately for mounting in or to a carton or other article.

BRIEF DESCRIPTION OF THE DRAWINGS

The foregoing, as well as other objects and advantages of the invention, will become apparent from the following detailed description when taken in conjunction with the accompanying drawings, wherein like reference characters designate like parts throughout the several views, and wherein:

FIG. 46 is an isometric view of the handle pack of FIG. 45, shown in its shipping configuration.

FIG. 47 is an isometric view of the handle pack of FIG. 46, shown with the shipping band removed and the handle partially extended.

FIG. 48 is a top isometric view of a lanyard box according to the invention prior to a lanyard being assembled thereto, wherein an empty and open lanyard box is positioned over a winding fork.

FIG. 49 is a top isometric view of the box of FIG. 48, showing a length of lanyard positioned between the prongs of the winding fork preparatory to winding the lanyard.

DETAILED DESCRIPTION OF THE PREFERRED EMBODIMENTS

Figure 1:
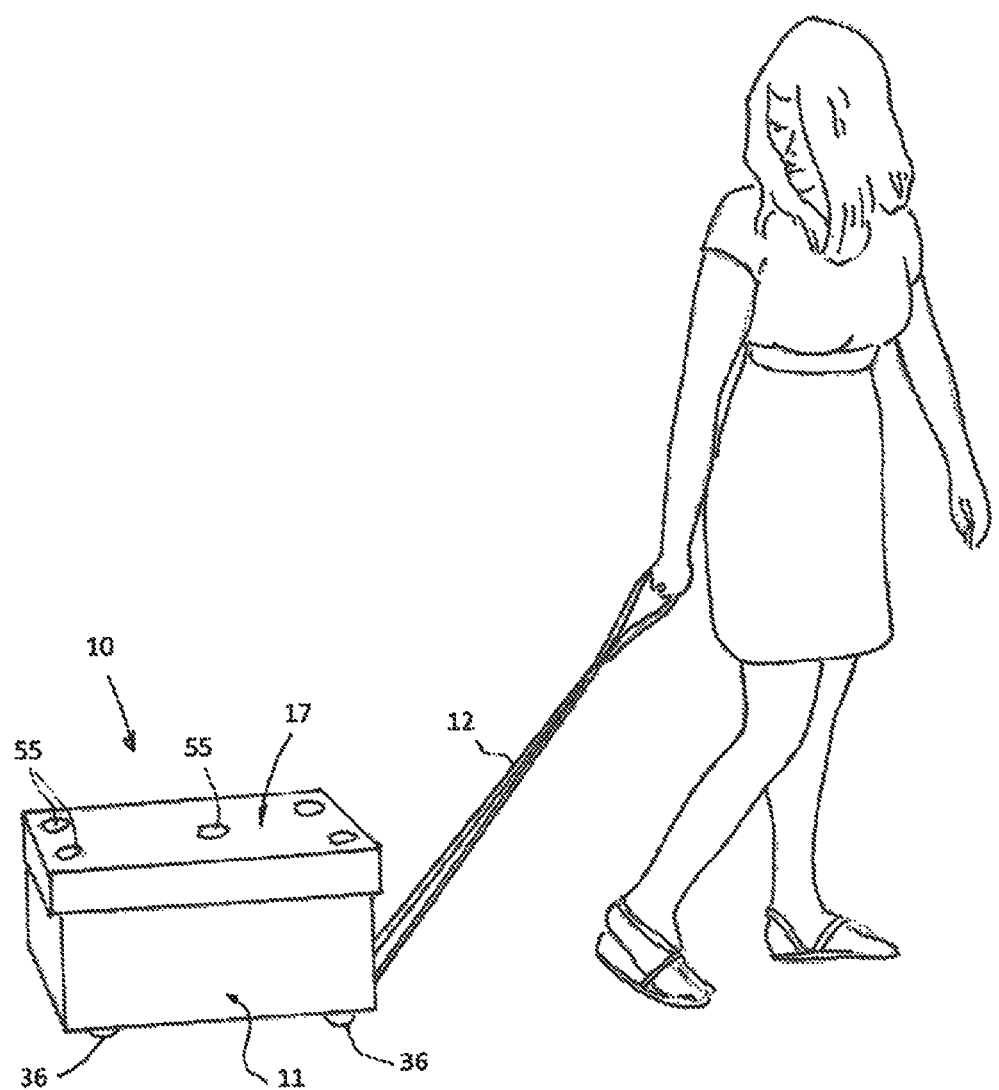
FIG. 1 is an isometric view of a wheeled carton according to the invention being pulled by a consumer.
Figure 2:
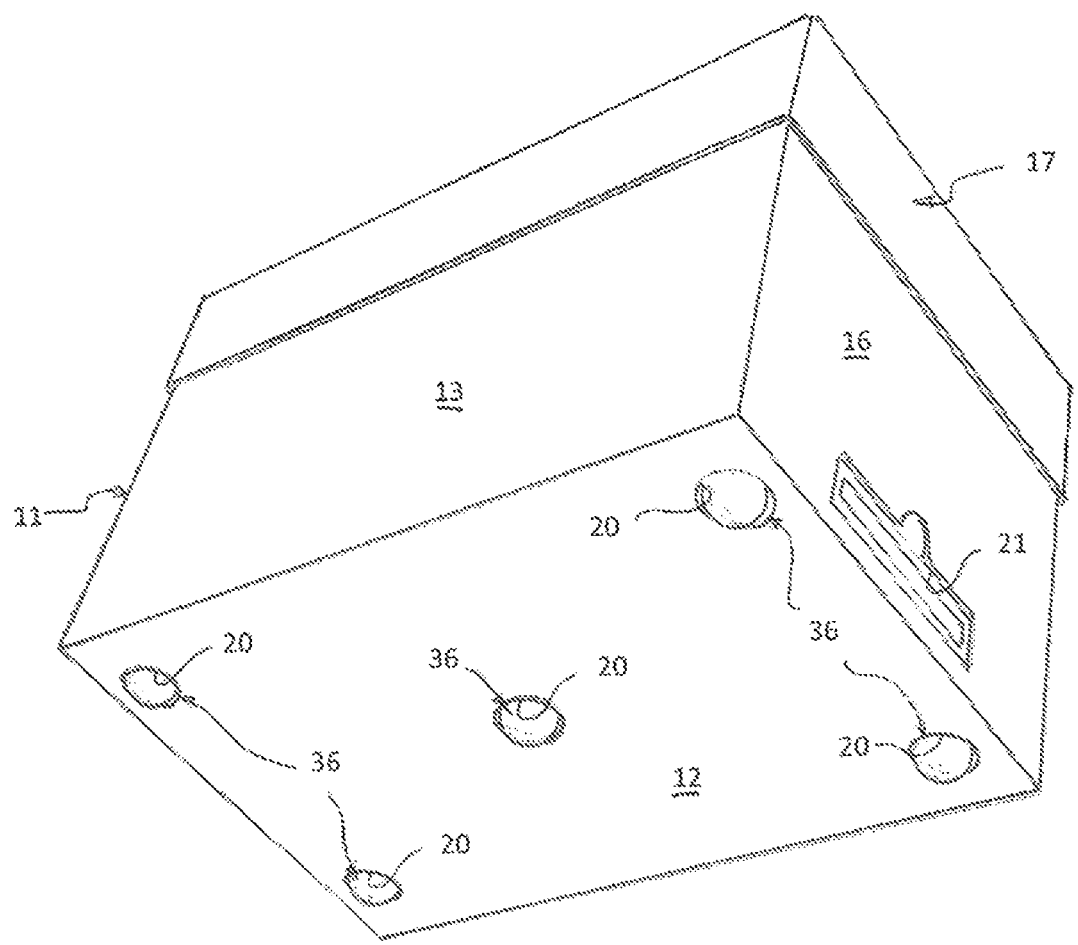
FIG. 2 is a bottom isometric view of the carton, showing the tow strap and handle in stowed position.
Figure 3:
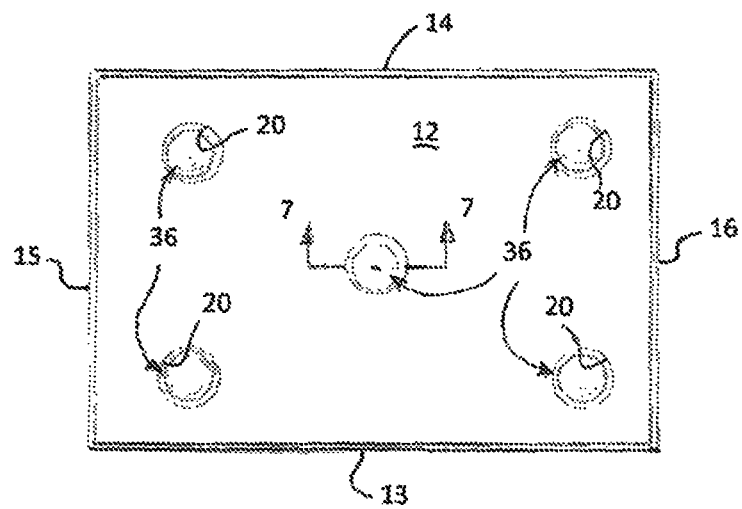
FIG. 3 is a bottom plan view of the carton.
Figure 4:
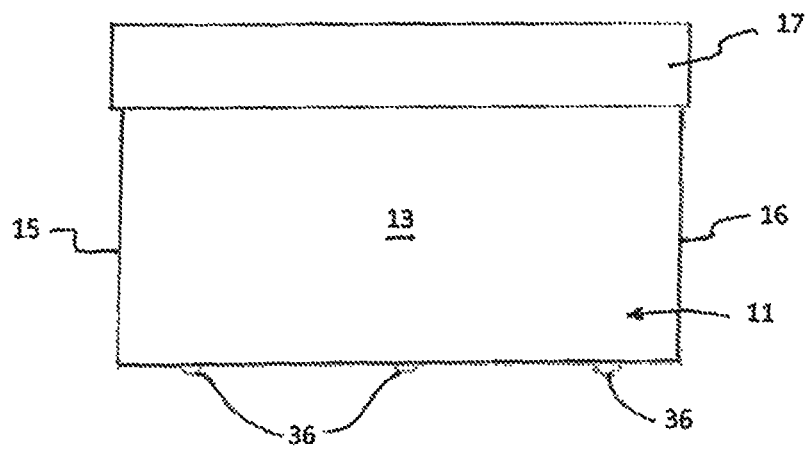
FIG. 4 is a side view in elevation of a carton according to the invention.

Referring more specifically to the drawings, a carton according to the invention is indicated generally at 10 in FIGS. 1-4, and is shown in FIG. 1 as being pulled along a supporting surface by a consumer. The carton in the particular example shown in these figures comprises a substantially standard carton 11 except for the modifications noted below, and has a bottom wall 12, opposite side walls 13 and 14, opposite end walls 15 and 16, and a lid or cover 17 covering the open top of the carton.

As adapted for the invention, and in the particular embodiments disclosed in FIGS. 1-15 and 20, cutouts 20 are formed through the bottom wall 12 of the carton adjacent each corner and in the center thereof, and an opening 21 is formed in one of its end walls 16 near the bottom edge of the end wall spaced midway between opposite sides of the carton. Further, the cover 17 has either a thickened top wall or, as shown in FIG. 5, a cover pad 22 is positioned beneath the cover top wall for a purpose described hereinafter.

A wheel assembly 30 according to a first preferred embodiment of the invention is positioned in the bottom of the carton and a tow strap 31 attached to one end thereof. The wheel assembly comprises a roller support platform 32 adapted to fit within the carton and having a plurality of circular cutouts 33 extending through its thickness, and recesses 34 and 35 in its underside extending radially outwardly from diametrically opposite sides of each cutout and formed only partially through the thickness of the platform. Rollers 36 are supported on the support platform. According to the preferred embodiment, the rollers comprise hardened spherical paper balls 37 with cylindrical stick paper axles 38 and 39 projecting from diametrically opposite sides thereof. Alternatively, the rollers 36 may be made from wood or plastic or other suitable material, with the balls 37 and axles 38, 39 either formed as one unitary piece or as two pieces assembled together. In the latter instance, the ball could be made with a hole through its center and the axle inserted through the hole so that it projects equally from opposite sides of the ball. In use, the balls are rotatably received in respective cutouts 33, and the axles projecting therefrom are rotatably supported in respective recesses 34 and 35. The cutouts and associated rollers 36 are positioned so that they are in aligned registry with the cutouts 20 in the bottom wall of the carton when the wheel assembly is placed in the carton. By recessing the rollers 36 into cutouts and recesses in the support platform the thickness of the wheel assembly is minimized.

Figure 6:
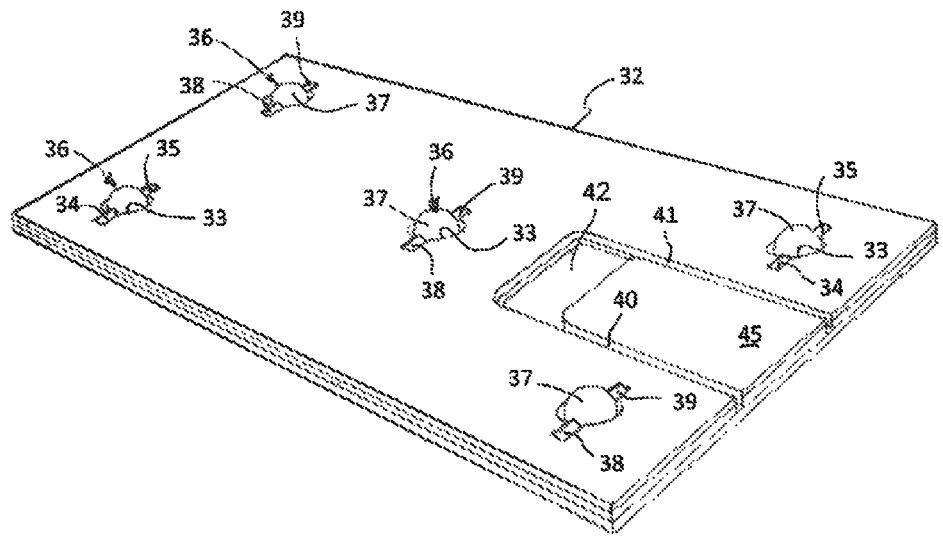
FIG. 6 is an enlarged bottom isometric view of the roller support platform of the invention, showing the channels and pocket for receiving the tow strap (not shown) and the cutouts and recesses for receiving the rollers (shown in place).
Figure 8:
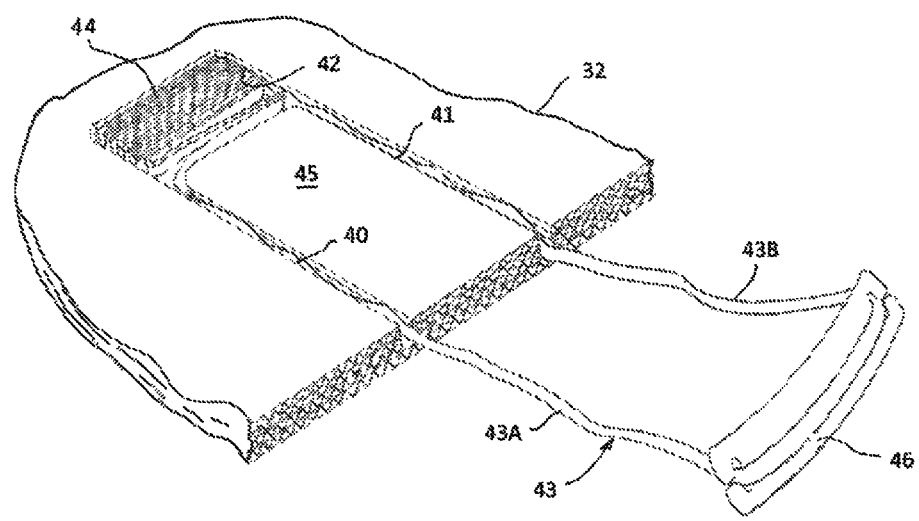
FIG. 8 is a further enlarged fragmentary bottom isometric view of the roller support platform, showing the channels and pocket for the tow strap, with the tow strap according-folded in the pocket and shown partially withdrawn from the support panel through the channels.
Figure 9:
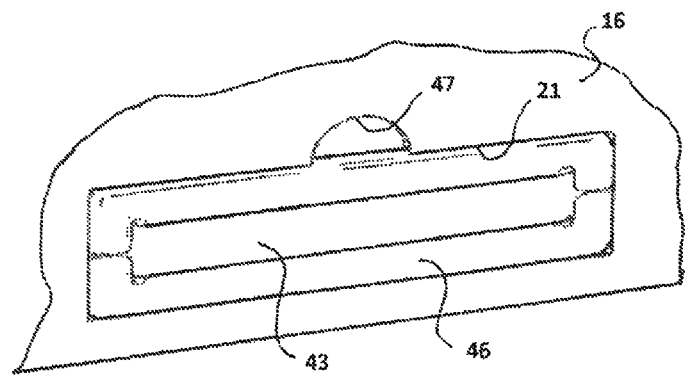
FIG. 9 is an enlarged fragmentary isometric view of one end of a carton according to the invention, showing the tow strap and handle in stowed position before the strap is withdrawn from the carton for use in pulling the carton along a supporting surface.
Figure 10:
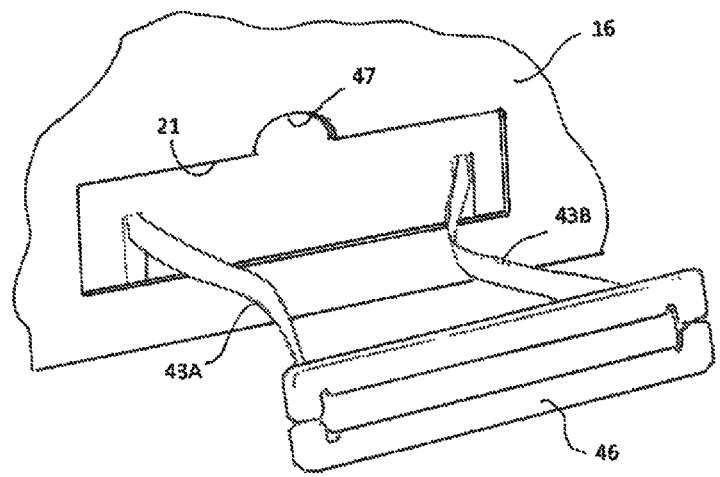
FIG. 10 is an enlarged fragmentary isometric view showing the tow strap and handle partially withdrawn from the carton.
Figure 11:
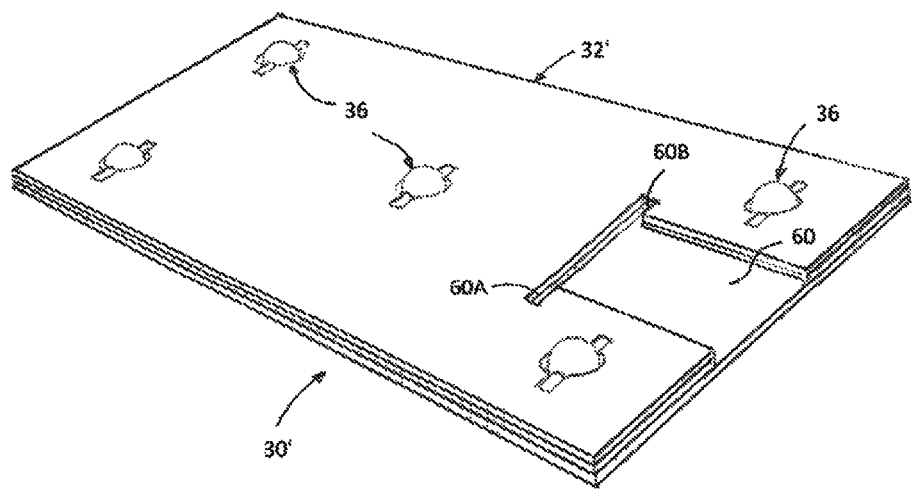
FIG. 11 is a bottom isometric view of an alternate embodiment of roller support platform, wherein a cutout is formed in the underside of the platform for receiving a pre-assembled tow strap cartridge.
Figure 12:
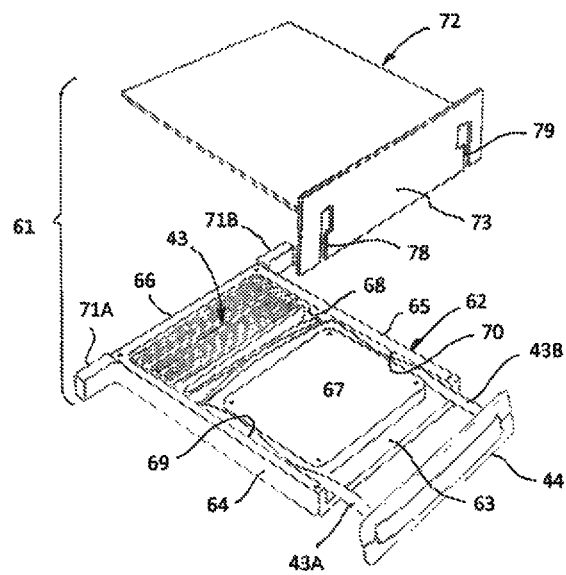
FIG. 12 is an exploded bottom isometric view of the tow strap cartridge for use with the platform of FIG. 11.
Figure 13:
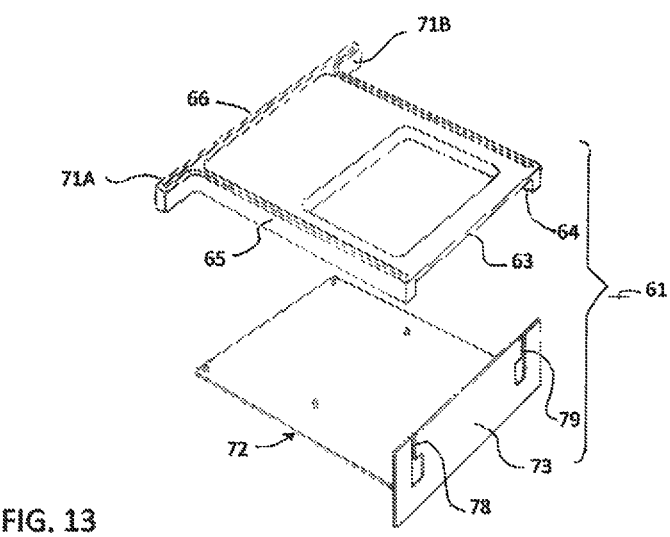
FIG. 13 is an exploded top isometric view of the tow strap cartridge for use with the platform of FIG. 11.
Figure 14:
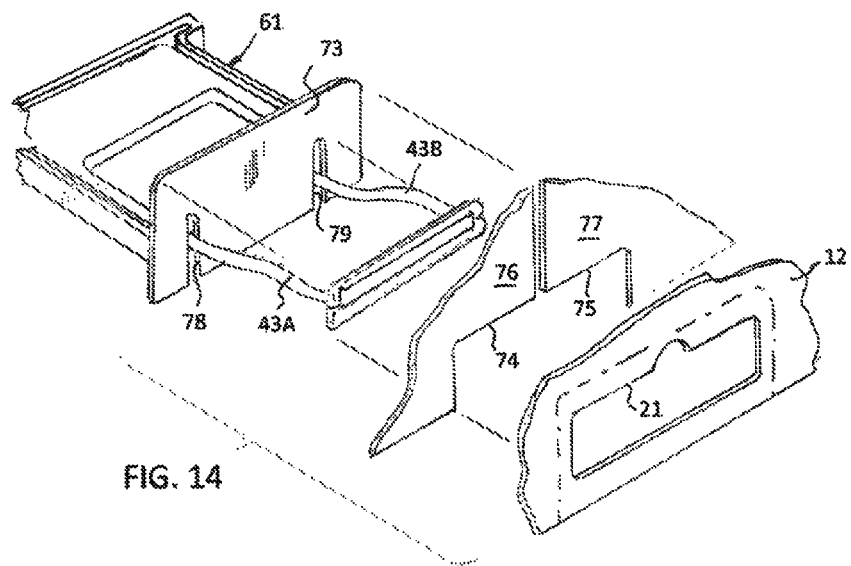
FIG. 14 is an exploded fragmentary isometric view showing the relationship between the cutout in the end wall of the carton, the inwardly folded carton end flaps, and the handle and tow strap and the cartridge front plate that covers the cutouts in the end flaps and end wall of the carton.

As seen best in FIGS. 6 and 8, a pair of elongate, spaced apart, recessed channels 40 and 41 are formed in the underside of the platform 32, extending inwardly from one edge thereof and partially through its thickness. The channels terminate at their inner ends at respective opposite sides of a recessed pocket 42 having the same depth as the channels. A looped tow strap 43 has opposite legs 43A and 43B received in a respective one of the channels 40 and 41, and the inner end of the looped strap is accordion-folded at 44 and stowed in the pocket 42. The spaced apart channels 40, 41 and the pocket 42 form an island 45 that traps the closed inner end of the strap loop and prevents separation of the strap from the support platform. A handle 46 is attached to the outer looped end of the strap loop, and as depicted in FIGS. 9 and 10, the handle is shaped and sized to substantially fill and close the opening 21 except for a notch 47 at a top edge of the opening to permit finger access behind one edge of the handle to pull it from the opening when the tow strap and handle are in their stowed position. In this regard, the handle is slightly longer than the opening 21 so that the opposite ends of the handle are engaged snugly in opposite ends of the opening to hold the handle in stowed position as shown in FIG. 9 until it is desired to withdraw it.

Figure 5:
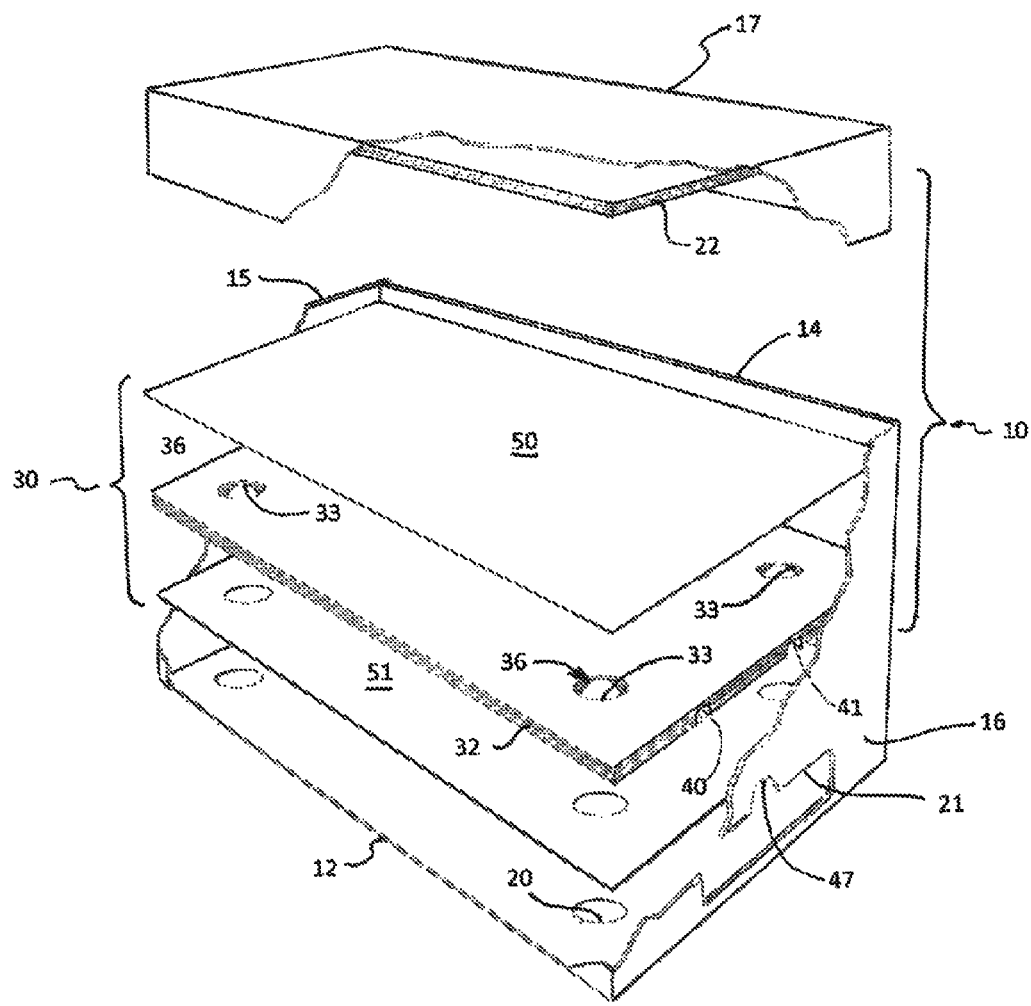
FIG. 5 is an exploded isometric view of the carton according to the invention, with portions broken away for purpose of illustration.
Figure 7:
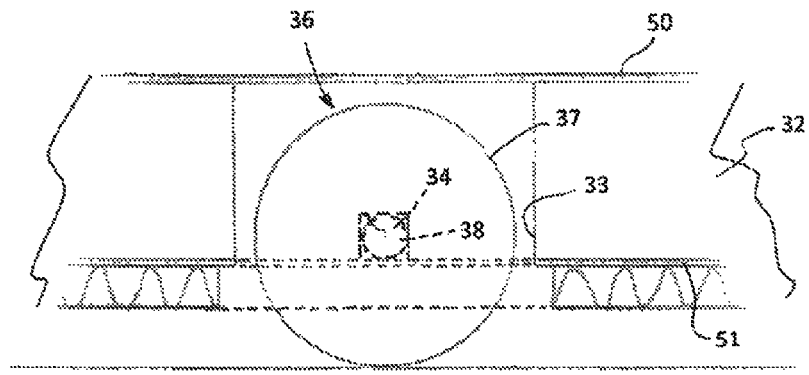
FIG. 7 is an enlarged fragmentary view in section taken along line 7-7 in FIG. 3.

As seen best in FIGS. 5 and 7, an upper wheel assembly pad 50 is attached to the top side of the roller support platform 32 to provide a smooth wheel assembly upper surface and prevent damage that might otherwise be caused by the cutouts 33 to paper stored in the carton. The upper pad 50 preferably is made of a water resistant material to prevent penetration of moisture into the carton. A lower wheel assembly pad 51 is attached to the underside of the platform 32 to strengthen the bottom of the carton and assist in holding the rollers 36 in place in their respective cutouts and recesses. Attachment of the pads 50 and 51 to the platform 52 can be accomplished by gluing, stapling, or other suitable means.

The completed wheel assembly 30, including the support platform 32, upper and lower pads 50 and 51, rollers 36, and tow strap 43 with its attached handle 46 are glued to the bottom-forming panel 12 of a flattened carton 10, with the rollers 36 projecting through the cutouts 20 in the panel 12. The flats are then normally shipped to a facility where one wall of the carton is folded up and a stack of reams of cut sheets of paper is slid onto the bottom panel until the stack is stopped by the upwardly folded wall. The remaining walls are then folded upwardly about the stack and suitably secured in place. The lid or cover is then positioned on top of the carton and secured in place with one or more straps.

A plurality of recesses or dimples 55 preferably are formed in the top wall of the cover 17 in positions to be in registry with the downwardly projecting rollers 36 of a superjacent carton when the cartons are stacked on top of one another. To provide room for the dimples, the top wall of the cover may be thickened, or as shown in FIG. 5, a cover pad 22 may be placed beneath the top wall of the cover.

As shown in FIGS. 11-15, a modified wheel assembly 30' comprises a modified roller support platform 32' and tow strap arrangement. Upper and lower wheel assembly pads 50 and 51 are used as in the previous embodiment, but are not shown in these figures. In this arrangement, a shaped recess 60 is formed in the underside of the platform at one end thereof, opening through the adjacent edge of the platform, and a pre-assembled tow strap cartridge 61 is supported in the recess. The recess 60 terminates at its rearward end in laterally outwardly projecting notches 60A and 60B.

Figure 15:
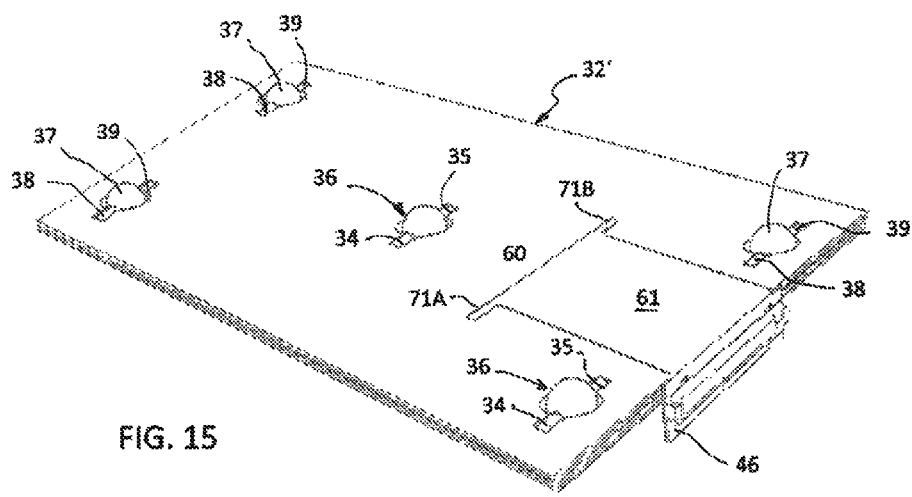
FIG. 15 is a bottom isometric view of the roller support platform of FIG. 11, with the cartridge of FIGS. 12 and 13 installed.

The cartridge 61 comprises a housing top member 62 having an open forward end 63, depending side walls 64 and 65 extending along opposite sides thereof, a depending end wall 66 across a rearward end, and a raised retainer 67 spaced between the side walls and longitudinally offset from the end wall 66. A pocket 68 is defined between the retainer and end wall 66, and the side walls and retainer define a pair of longitudinal channels 69 and 70 extending from the open end of the housing to the pocket. A looped tow strap 43 is accordion-pleated and placed in the pocket, with the legs 43A and 43B thereof extending through a respective channel and through the open forward end. A handle 46 preferably is attached to the outer end of the looped strap. Tabs 71A and 71B project laterally outwardly from opposite sides of the rearward end of the housing 62, and when the cartridge is in operative position in the platform 32' as shown in FIG. 15 these tabs are received in notches 60A and 60B. The tabs 71A and 71B, in cooperation with the lower wheel assembly pad 51, retain the cartridge in the recess 60. A cover 72 is assembled to the housing top member 62 in overlying relationship to the channels and pocket to retain the tow strap in the pocket and channels but enable withdrawal of the strap legs 43A and 43B through the channels. The raised retainer 67 and cover 72 cooperate to trap the rearward end of the looped tow strap behind the retainer so that it cannot be withdrawn completely from the cartridge housing. A forward end wall 73 on the cartridge housing forms a cover plate that is shaped and sized to cover the cutout 21 in the carton end wall 16 and the cutouts 74 and 75 in the lower adjacent edges of the carton end flaps 76 and 77, as indicated by the dot-and-dash lines in FIG. 14, protecting the interior of the carton against ingress of dirt, moisture, and the like through the cutouts. Notches 78 and 79 in the bottom edge of the end wall 73 provide clearance for the strap 43A, 43B as they are pulled forwardly from the cartridge through the end wall 73 and through the cutouts 74, 75 and 21.

The cartridge housing, including the cover 72 and end wall 73, may be made of plastic or paper or other suitable material, although an easily recyclable material such as paper is preferred.

Figure 16:
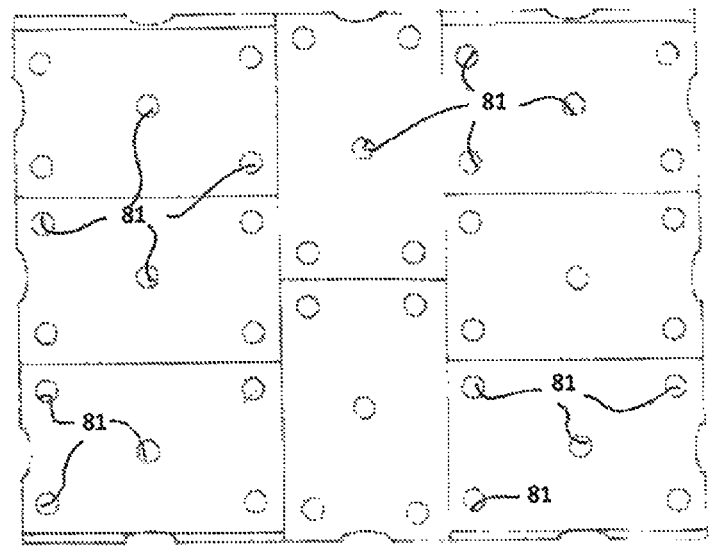
FIG. 16 is a top plan view of a dimpled pallet blanket accessory that may be used with the invention.
Figure 17:
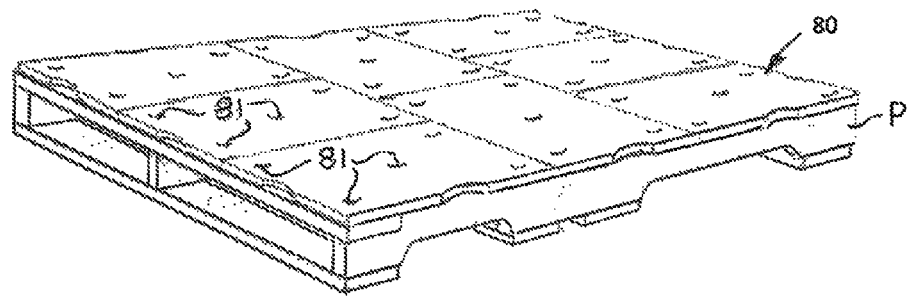
FIG. 17 is a top isometric view of a typical wood pallet with the pallet blanket resting on it.

A pallet blanket accessory 80 having a plurality of dimples 81 in its upper surface may be provided for placement on a pallet P as shown in FIGS. 16 and 17 to prevent damage to the rollers in the bottom cartons stacked on a pallet. When the pallet blanket is used, the rollers of the bottom cartons on the pallet are received in the dimples of the blanket, permitting the bottoms of the cartons adjacent the pallet to rest on the blanket.

Similarly, to enable stable positioning of a carton according to the invention on a shelf S, a shelf pad accessory 90 having a plurality of dimples 91 in its upper surface may be provided as shown in FIG. 17. Use of the shelf pad prevents unwanted rolling of the carton on the shelf.

Figure 18:
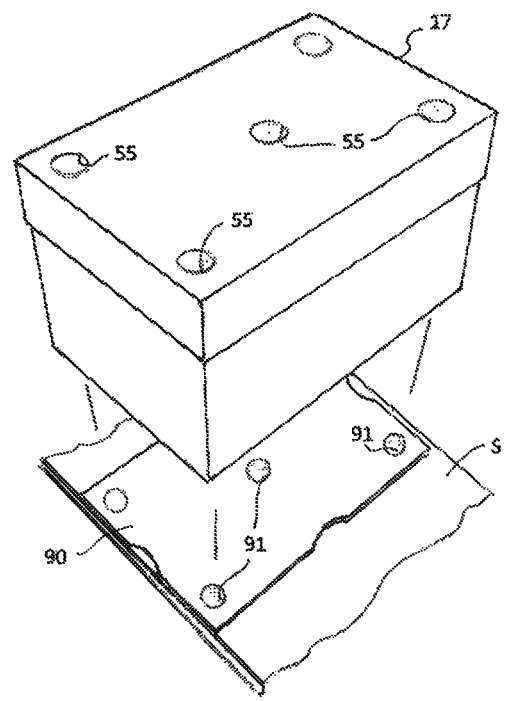
FIG. 18 is an exploded top isometric view of a carton according to the invention, and a dimpled shelf pad accessory that may be placed on a shelf for use with the carton.
Figure 19:
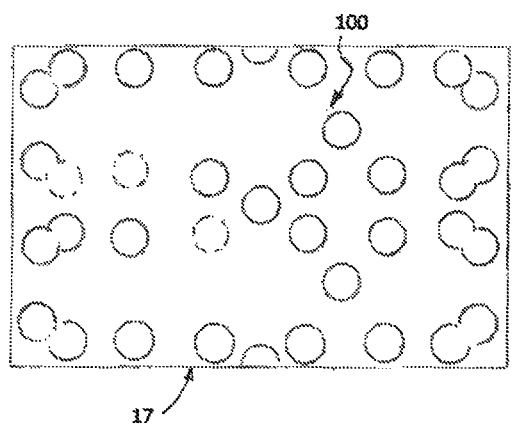
FIG. 19 is a top plan view of a dimpled carton cover, showing a dimple array that may be provided to enable different stacking arrangements of the cartons of the invention, including cross-stacking.

In order to enable different stacking configurations of cartons according to the invention, including cross-stacking, the dimples in the upper surface of the carton cover have to be arranged in a particular pattern. One such arrangement is shown at 100 in FIG. 18.

Figure 20:
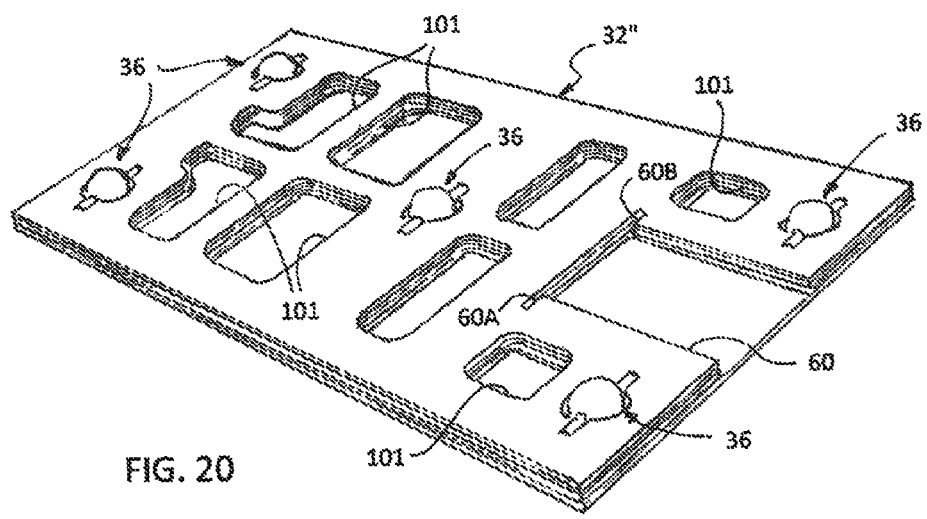
FIG. 20 is a bottom isometric view of a modified version of the platform of FIG. 11, wherein material is cut away to reduce the weight of the platform.

FIG. 20 shows a modified roller support platform 32", wherein areas are cut away at 101 to reduce weight. The particular size and arrangement of cut away areas shown is one example of how weight savings can be accomplished, but it should be understood that other suitable arrangements may be utilized.

In a specific construction of a carton according to the first embodiment of the invention, the roller balls 37 preferably have a diameter of from about ¾ inch to about 1¼ inches, the axles 38 and 39 each have a diameter of about ¼ inch and a length of about 1 inch, and the upper and lower wheel assembly pads 50 and 51 applied to the roller support platform 32 each have a thickness of about $\frac{1}{32}$ of an inch The combined thickness of the roller support platform 32 or 32' and upper and lower platform pads 50 and 51 is about $\frac{21}{32}$ of an inch, and the cover pad 56 has a thickness of about $\frac{15}{32}$ of an inch. With a 1¼ inch diameter roller, a ground clearance of about ⅜ of an inch will be obtained, whereas a 1 inch diameter roller will give $\frac{3}{16}$ to ¼ inch ground clearance. The tops of the rollers will be spaced about $\frac{1}{16}$ of an inch below the upper pad 50 on the roller support platform.

Figure 21:
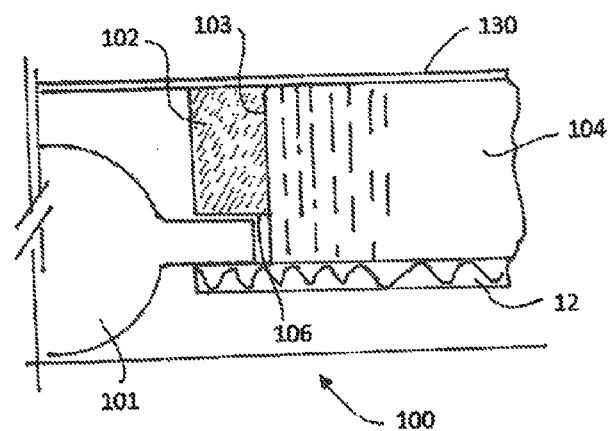
FIG. 21 is an enlarged fragmentary view in section of a portion of the wheel assembly in the second preferred embodiment of the invention, taken along line 21-21 in FIG. 23.
Figure 22:
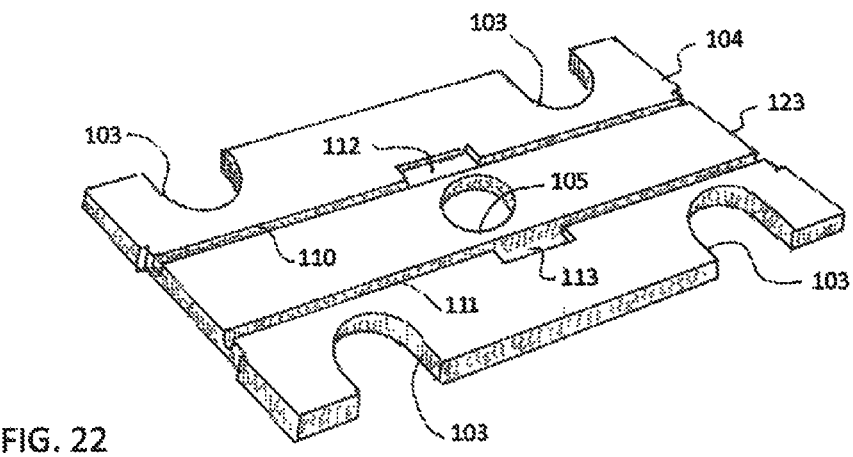
FIG. 22 is a top isometric view of the honeycomb platform panel, showing the channels and pockets for receiving the strap loop.
Figure 23:
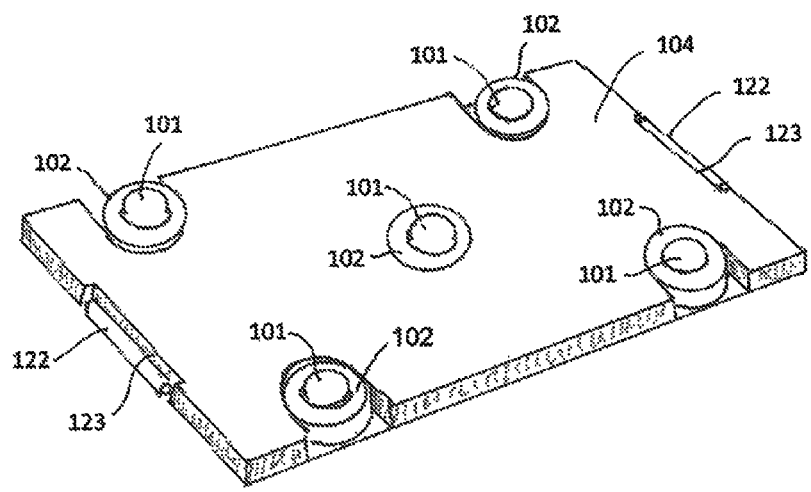
FIG. 23 is a bottom isometric view of an assembled wheel assembly according to the second embodiment of the invention.

A wheel assembly according to a second preferred embodiment of the invention is referenced generally at 100 in FIGS. 21-33. In this form of the invention rollers 101 are mounted in and supported by short rigid roller support cylinders 102 glued in cutouts 103 extended through a roller support platform 104 at opposite side edges of the platform and spaced slightly inwardly from opposite ends thereof. A roller 101 and its support cylinder 102 are also mounted in a center cutout 105 in the middle of the platform. As seen in FIG. 21, the opposite ends of the support cylinders terminate at the top and bottom surfaces of the platform and the rollers are mounted so that they project from the bottom ends of the cylinders and downwardly past the bottom of the platform. As shown in this figure, the wheel assembly is mounted inside a carton above the bottom wall 12, although if desired it could be mounted to the bottom wall outside the carton. If mounted inside the carton, as shown, the bottom wall 12 has cutouts 20 therethrough in alignment with the rollers, as in the previous embodiment (see FIG. 2) so that the rollers extend through the cutouts to support the bottom of the carton above a surface S.

Undercut notches 106 are formed in the bottom ends of the support cylinders on diametrically opposite sides thereof, and short axles 107, 108 projecting from opposite sides of the rollers are engaged in these notches. The undercut holds the axles in the notches so that the rollers are not displaced from the support cylinders during handling, and the depth of the notches is selected so that the rollers project downwardly through the cutouts as described above.

Figure 26A:
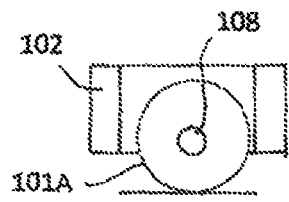
FIG. 26A is a side view, shown partially in section, of a first form of roller and support cylinder as used in the second embodiment of the invention, wherein the roller comprises a ball.
Figure 26B:
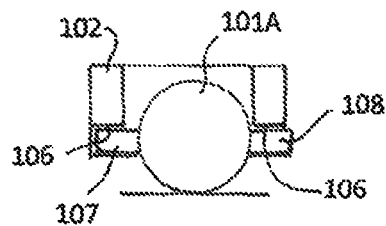
FIG. 26B is a front view, shown partially in section, of the roller ball and support cylinder of FIG. 26A.
Figure 26C:
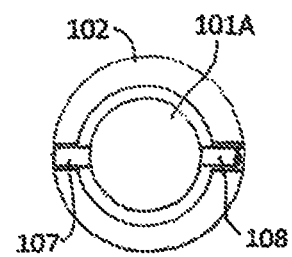
FIG. 26C is a plan view looking toward the bottom end of the roller ball and support cylinder of FIG. 26B.
Figure 27A:
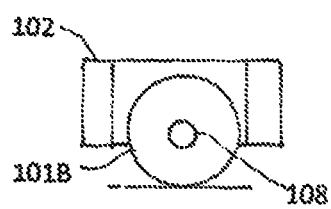
FIGS. 27A-27C are views similar to FIGS. 26A-26C of a second form of roller and support cylinder, wherein the roller comprises a wheel.
Figure 27B:
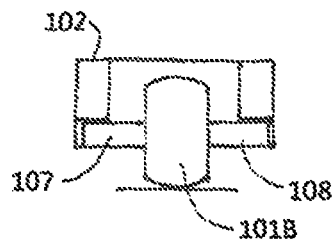
Figure 27C:
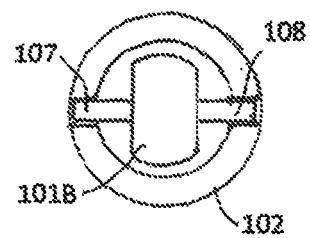
Figure 28A:
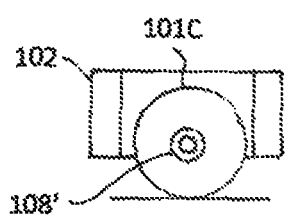
FIGS. 28A-28C are views similar to FIGS. 27A-27C of a third form of roller and support cylinder, wherein the roller comprises a wheel with a flanged or stepped axle.
Figure 28B:
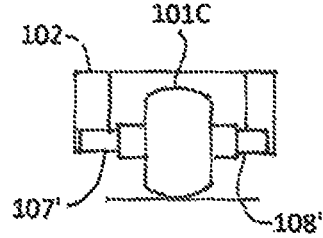
Figure 28C:
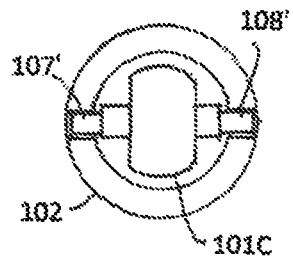
Figure 29:
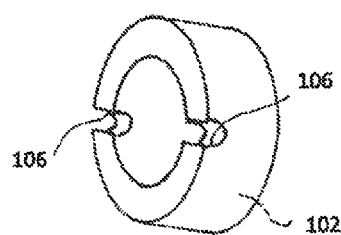
FIG. 29 is an isometric view of a support cylinder as used in the invention.
Figure 30:
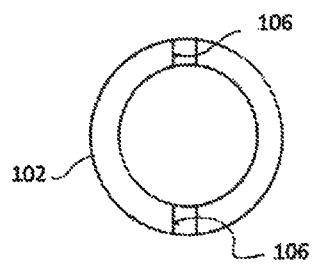
FIG. 30 is a bottom plan view of the support cylinder of FIG. 29, looking toward the bottom end of the support cylinder.
Figure 31:
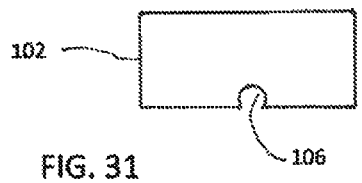
FIG. 31 is a side view in elevation of the support cylinder of FIG. 29.
Figure 32:
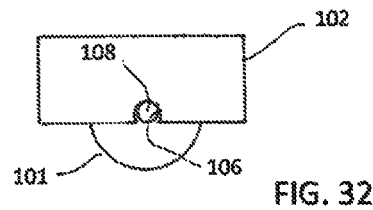
FIG. 32 is a side view in elevation of the support cylinder of FIG. 31, with a roller assembled in place in the cylinder.

The rollers may have any suitable form, such as the balls 101A shown in FIGS. 26A-26C, wheels 101B as shown in FIGS. 27A-27C, or wheels 101C with flanged or stepped axles 107', 108' as shown in FIGS. 28A-28C.

The support platform 104 is made of corrugated material having a honeycomb core with heavy duty liners. One suitable material is Hexacomb® D/C, core type 1, with heavy facings, available from Pregis Corporation of Lake Forest, Ill.

Channels 110 and 111 are formed in the top surface of the platform 104, extending longitudinally thereof through opposite ends of the platform and on opposite sides of the center cutout 105. The channels may be formed in any suitable manner, as by crushing or cutting. Pockets 112 and 113 are formed in the top surface of the platform approximately midway of the length of the channels adjacent the center cutout and on the side of the respective channel opposite the center cutout.

Figure 24:
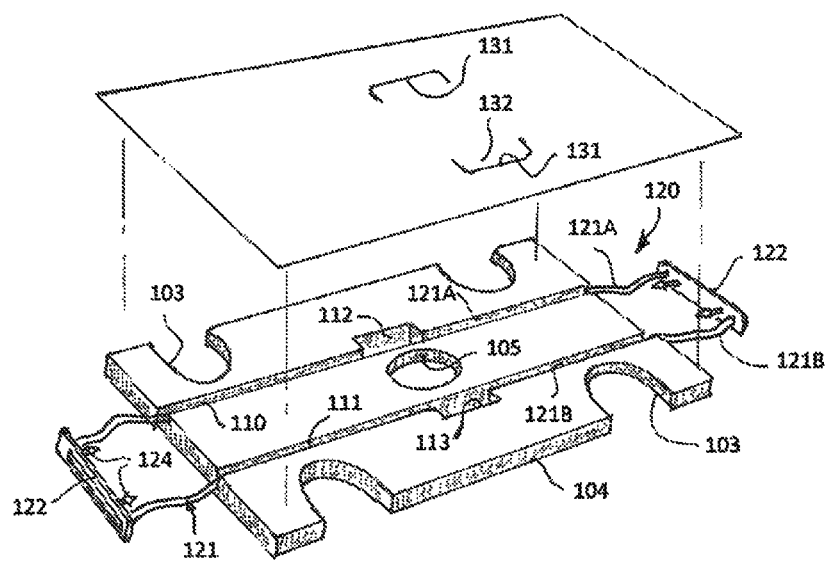
FIG. 24 is an exploded top isometric view of the platform panel and cover pad according to the second preferred embodiment of the invention, with a tow strap loop received in the channels and pockets formed in the top surface of the panel.
Figure 25:
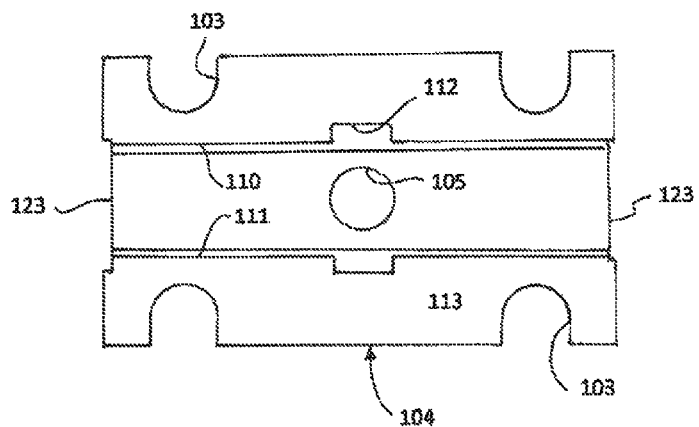
FIG. 25 is a top plan view of the platform panel according to the second embodiment of the invention.
Figure 33:
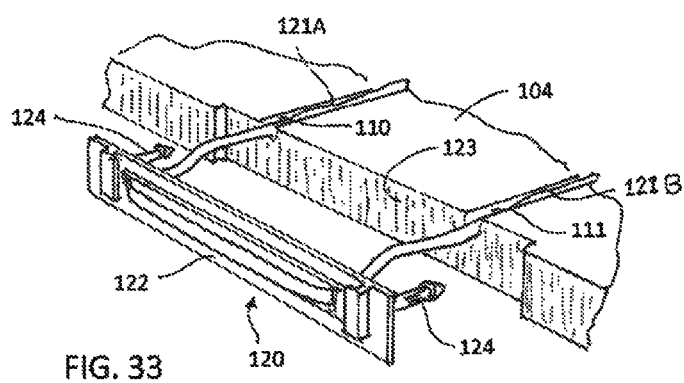
FIG. 33 is an enlarged fragmentary isometric view of a portion of the support platform and tow strap assembly according the second embodiment of the invention, showing a handle attached to the outer end of the tow strap.

A double tow strap arrangement 120 is provided in the particular example shown, although it should be understood that any of the single tow strap arrangements described in connection with the previous embodiments could be used if desired. The double tow strap comprises a single continuous loop 121 with opposite legs 121A, 121B of the loop received in a respective channel 110 or 111. The loop is substantially longer than the support platform 104, and the central portions of the legs are accordion-folded and stowed in a respective pocket 112 or 113, as shown in FIG. 24. Handle pads 122 may be provided on the outer ends of the tow straps, as shown in FIGS. 24 and 33. Although the outer ends of the tow straps and the associated handle pads are shown spaced from the respective opposite ends of the platform 104 in FIGS. 24 and 33, the handle pads are normally stowed in shallow recesses 123 in respective opposite ends of the support platform so that the handle pads are substantially flush with the ends of the platform. Barbs 124 on the back or inside surface of the handle pads are inserted into the core of the support platform to hold the handles in place until it is desired to use them to pull the carton along a surface.

When the wheel assembly 100 is mounted inside the carton as depicted in FIG. 21, it will be necessary to provide cutouts in a bottom portion of those walls adjacent the outer ends of the tow straps to enable access to the tow straps, as in the previous embodiments.

As seen in FIG. 21, a support platform cover sheet or pad 130 is glued to the top surface of the platform 104 in covering relationship to the cutouts and tow strap to prevent damage to paper (not shown) stored in the carton and to hold the tow strap in the channels and pockets. The platform is supported immediately on top of the bottom wall 12 of the carton. Generally U-shaped cuts 131 are made in the platform, forming bendable flaps 132 in positions to be in registry with the pockets 112 and 113 to enable access to the accordion-folded straps in the pockets. In a preferred construction, the cover sheet is made of fiberboard.

In a specific construction of this form of the invention, the channels 110, 111 and pockets 112, 113 are punch-cut to a depth of about 0.25 inch, and depending upon the diameter of the rollers, the support platform has a thickness of either 1.0 inch or 0.75 inch. In a construction wherein the support platform has a thickness of 1.0 inch and the support cylinders have a length of 1.0 inch, a roller ball or wheel having a diameter of 1.25 inches and axles with a diameter of 0.25 inches received in notches 106 of approximately 0.25 inch depth will result in the roller ball or wheel projecting below the bottom the carton sufficiently to provide a floor clearance of about 5/16 inch.

In this double tow strap arrangement, only one tow strap can be pulled from one end or the other of the carton and used to pull the carton along a surface. If desired, both tow straps can be pulled from the carton and wrapped upwardly around the carton for use as a handle or handles to lift the carton.

An alternate embodiment of wheel assembly and tow strap is indicated generally at 140 in FIGS. 34-41. In this form of the invention at least one of the axles 141 is elongated and extends past the outer diameter of the roller support cylinder 102. The extended axle is received in an adjacent notch 142 in the support platform 143 and serves to properly orient the roller. In the particular example shown, only one of the axles is extended in those rollers positioned along the sides of the platform, but both axles can be extended in the center roller and notches 142A and 142B provided on opposite sides of the opening 144 for receiving the center roller and its support cylinder (not shown).

Figure 34:
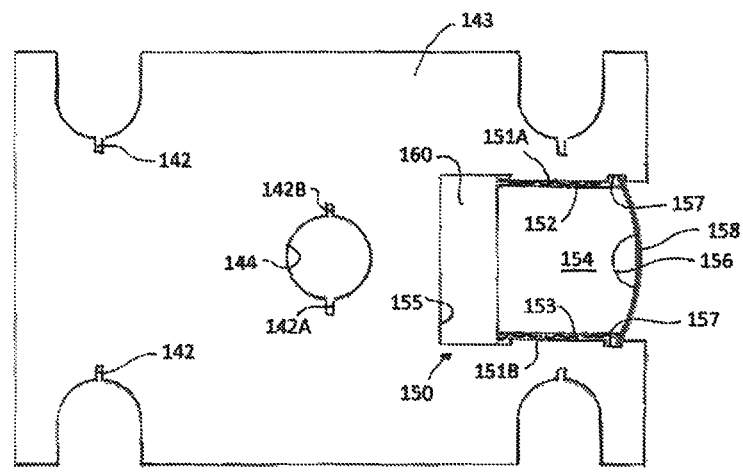
FIG. 34 is a top plan view of a modified wheel assembly platform and attached handle pack, wherein at least one axle on each roller is extended and received in a notch in the platform to orient the roller.
Figures 35, 36:
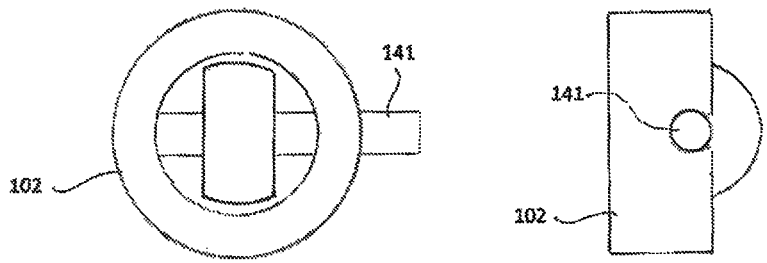
FIG. 35 is a bottom plan view of one of the roller support cylinders and rollers with extended axle used in the embodiment of FIG. 34.
FIG. 36 is a side view in elevation of the support cylinder and roller of FIG. 35.
Figure 37:
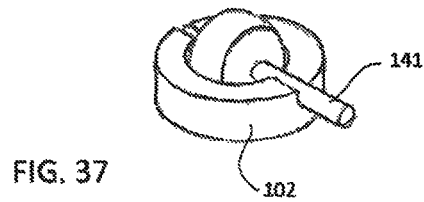
FIG. 37 is a bottom isometric view of the support cylinder and roller of FIGS. 35 and 36.
Figure 38:
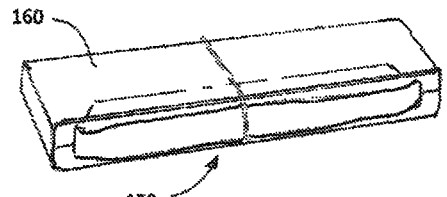
FIG. 38 is a top isometric view of a first form of handle pack for use in the invention, shown in shipping configuration.
Figure 39:
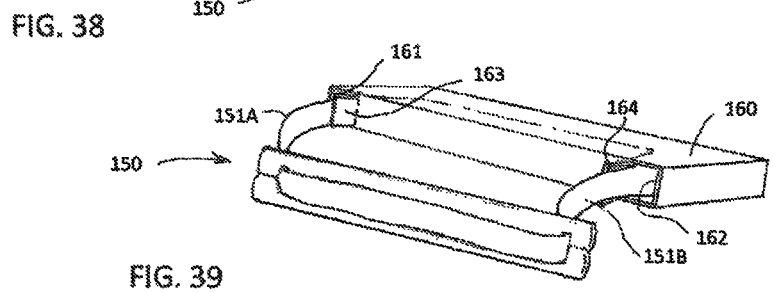
FIG. 39 is an isometric view of the handle pack of FIG. 38, with the shipping band removed and the handle partially extended.
Figure 40:
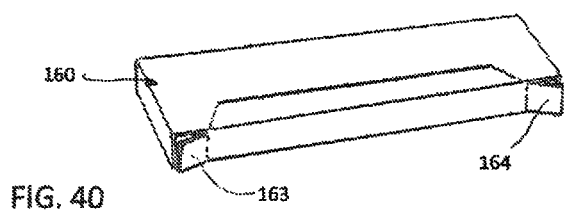
FIG. 40 is an isometric view of the box in which the lanyard is stowed in the handle pack of FIGS. 38 and 39.
Figure 41:
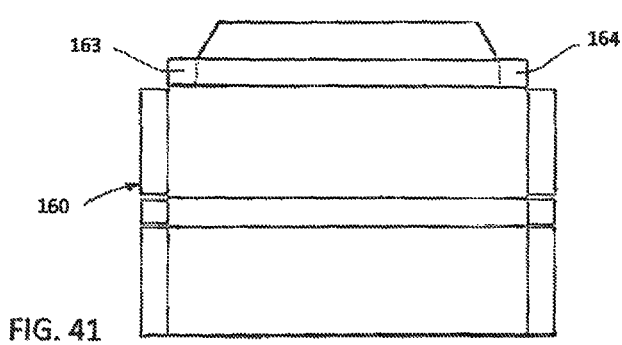
FIG. 41 is a plan view of the blank used in making the lanyard box of FIG. 40.

Also, in the FIG. 34 embodiment a handle pack 150 is provided at only one end of the wheel assembly platform. The handle pack 150 is elongated and the legs 151A, 151B of the tow strap 151 extend in parallel relationship to one another through parallel channels 152, 153 in the platform. A land or island 154 is formed between the channels 152, 153 and the recess 155 for receiving the handle pack. The outer edge of the island is convexly curved and has a semi-circular recess 156 formed in its center. A notch 157 is formed in the outer wall of each channel near its outer end. The handle 158 is curved to lie against the curved edge of the island and the opposite ends of the handle are engaged in the notches 157 to hold the handle in its stowed position.

As seen best in FIGS. 38-41, the handle pack 150 comprises a rectangular box 160 preferably formed of paperboard. The tow strap 150 is appropriately folded and stowed in this box, with the opposite legs 151A and 151B thereof extended through openings 161, 162 in opposite ends of the forward edge of the box. Small flaps 163, 164 folded from the material of the box at the inner edges of the openings 161, 162 serve to guide the legs of the tow strap as it enters the channels 152, 153 and prevent snagging of the strap as it is pulled from the box and outwardly through the channels. See FIGS. 42 and 43.

Figure 42:
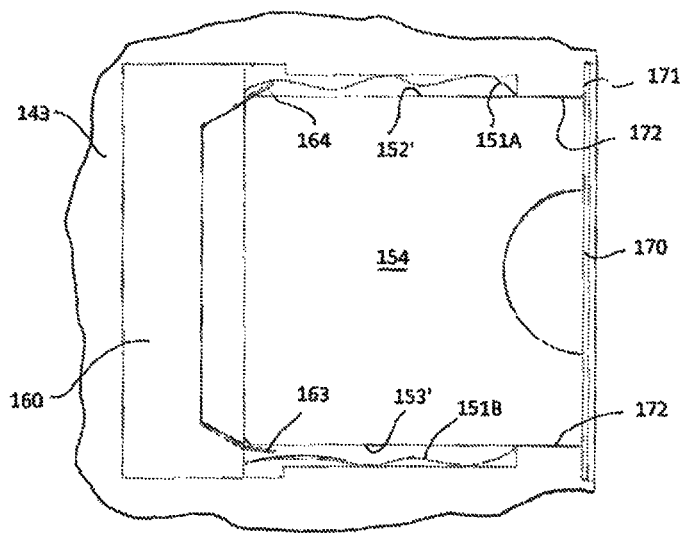
FIG. 42 is a fragmentary bottom plan view of the handle pack of FIG. 38 installed on a wheel assembly platform, with the forward ends of the lanyard channels in the platform formed as slits and the lanyard extended through these slits.

FIG. 42 shows an alternate arrangement wherein the handle 170 is straight and is nested in a recess 171 in the edge of the platform so that the handle is substantially flush with the outside of the carton when it is in its stowed position. Inadvertent displacement of the handle from the recess is prevented by narrowing the outer ends of the channels 152', 153' to slits 172 which frictionally engage the legs of the tow strap to retain it in position until it is deliberately withdrawn for use. When it is desired to withdraw the tow strap, the center of the handle can be pushed into the arcuate recess 156, which causes the opposite ends of the handle to flex outwardly where they can be accessed.

Figure 43:
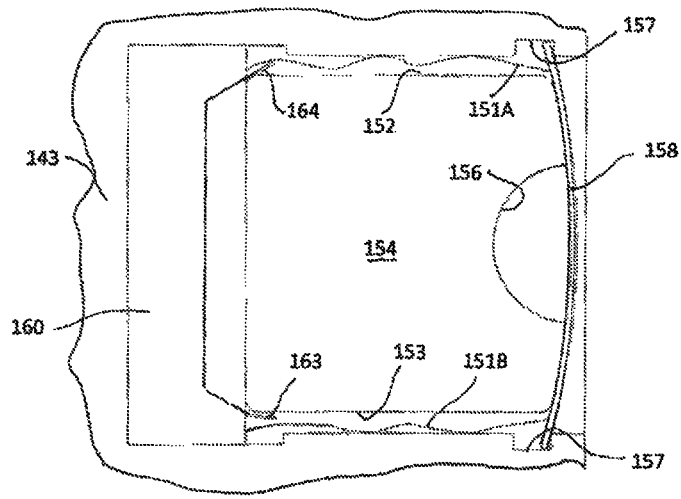
FIG. 43 a fragmentary bottom plan view of a slightly modified handle pack of FIG. 38, wherein the handle is curved and the lanyard channels continue as slots, i.e. are not reduced to slits where they extend through the edge of the platform.

FIG. 43 is an enlargement of the tow strap arrangement shown in FIG. 34.

Figure 44:
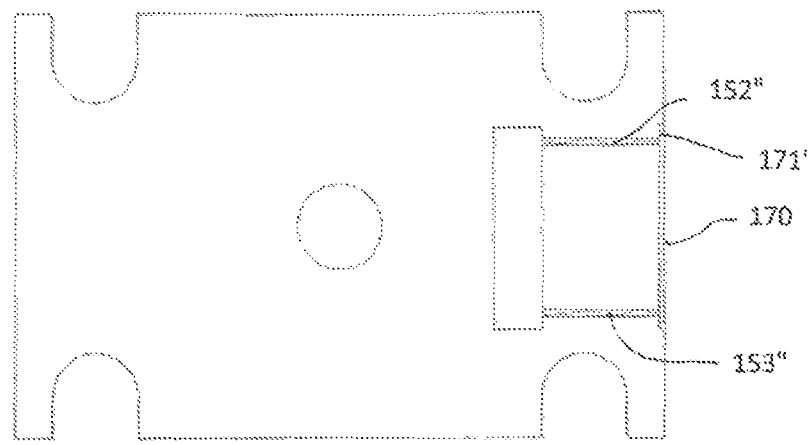
FIG. 44 is a bottom plan view of a wheel assembly platform with a handle pack assembled to only one end thereof.

FIG. 44 shows a variation of the tow strap arrangement of FIG. 44, but wherein the channels 152", 153" have a constant width throughout their length and the outer ends are not reduced to slits as in the previous embodiment. In this embodiment, the handle 170 is frictionally received in the recess 171' to retain it in stowed position until it is desired to withdraw it. Also, this embodiment shows the platform without notches 142 for receiving an extended axle on the roller, and could be used with a roller assembly as shown in FIGS. 26A-28C, for example.

Figure 45:
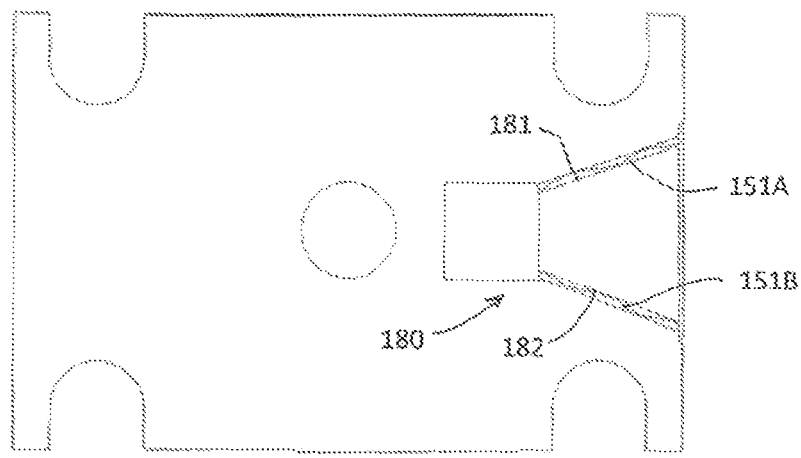
FIG. 45 is a bottom plan view of a variation of the assembly shown in FIG. 44, wherein the handle pack is square rather than elongate and the lanyard channels and lanyards diverge as they extend from the lanyard box through the edge of the platform.
Figure 50:
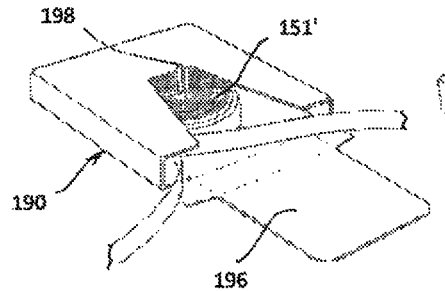
FIG. 50 depicts the lanyard being wound into a coil by rotation of the winding fork.
Figure 51:
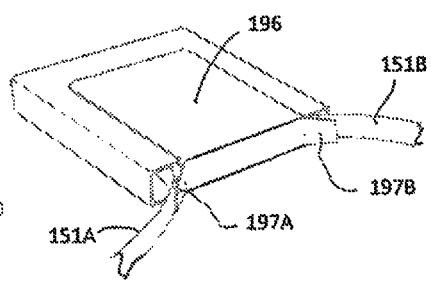
FIG. 51 depicts the pack after the lanyard has been wound, the winding fork withdrawn, and the box closed and sealed with opposite legs of the lanyard extending from opposite corners of the box.
Figure 52:
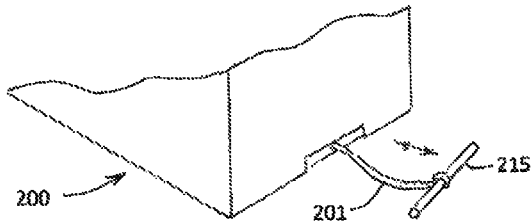
FIG. 52 is a top front isometric view of an embodiment of the invention wherein the tow strap is retractable into the carton.
Figure 53:
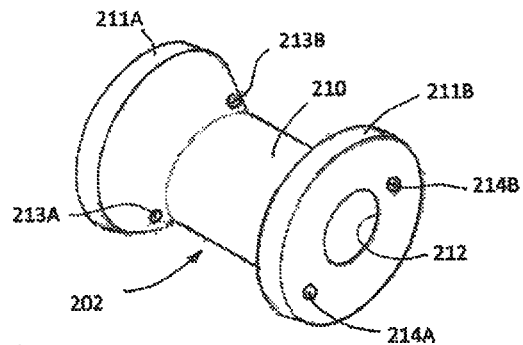
FIG. 53 is an isometric view of a spool for use in the retractable lanyard embodiment.
Figure 54:
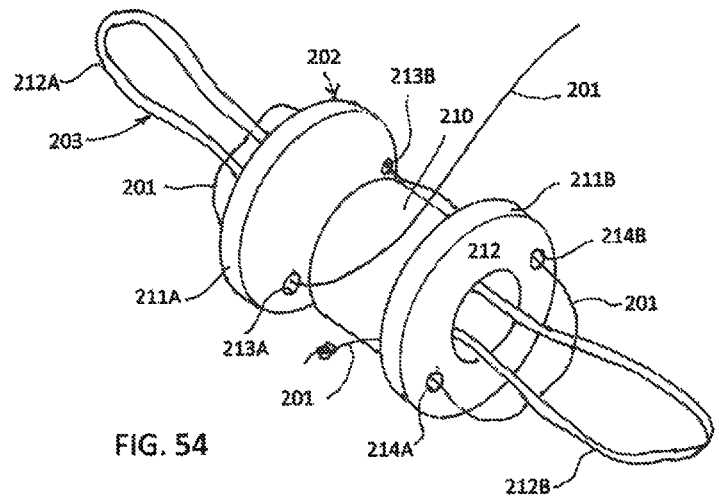
FIG. 54 is a fragmentary isometric view depicting how the lanyard and torsion spring may be operatively connected with the spool in a preferred embodiment of the invention.
Figure 55:
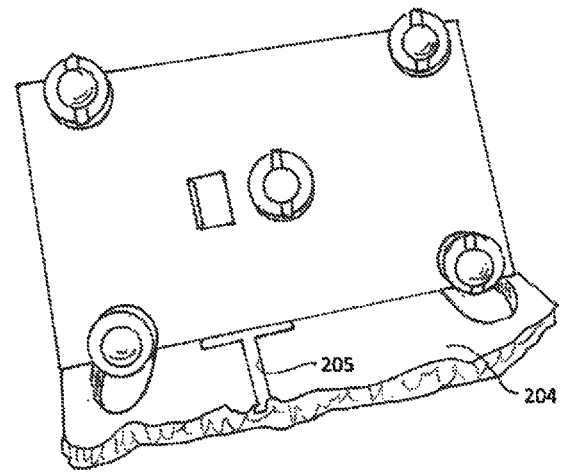
FIG. 55 is a fragmentary partially exploded top isometric view of the wheel assembly and retractable tow handle of the embodiment shown in FIG. 52.

FIGS. 45-47 depict a variation of the FIG. 44 embodiment, wherein the handle pack 180 is square rather than elongated as in the FIG. 44 embodiment, and the channels 181, 182 for receiving the legs 151A, 151B of the tow strap diverge outwardly through the adjacent edge of the platform. The handle pack 180 is shown in its shipping configuration in FIG. 46, and with the shipping band removed and the handle partially extended in FIG. 47.

FIGS. 48-51 depict one way in which the tow strap 150' can be wound or coiled in the handle pack box 190. As shown in FIG. 48, a bottom wall 191 of the box has a hole 192 substantially in the center thereof, and the top wall 193 has a trapezoidally shaped cutout 194 therein, extending at its open end through the forward edge of the wall 193 and at its closed inner end to just past the hole 192 in the bottom wall. A flange 195 of narrower width than the bottom wall is foldably joined to the forward edge of the bottom wall, and a closure flap 196 is foldably joined to that edge of the flange opposite its folded connection with the bottom wall. Small flaps 197A, 197B are foldably joined to opposite ends of the flange 195. In use, the hole 192 of the open box is positioned over a winding fork 198 and the tow strap is placed between the tines of the fork. The fork is then rotated to wind the tow strap into a coil, and the legs 151A, 151B of the strap are positioned to extend through the corners of the open end of the box. The winding fork is then withdrawn and the closure flap 196 is closed and sealed.

An embodiment with a retractable lanyard is indicated generally at 200 in FIGS. 52-58. In this form of the invention the lanyard comprises a single length of cord or rope 201 wound around a spool 202 that is connected with a torsion spring 203. Mechanical energy is stored in the torsion spring when the lanyard is pulled to unwind it from the spool, and upon release of the lanyard the torsion spring rotates the spool to rewind the lanyard on it. The retractable lanyard is mounted to a platform 204 that in a preferred embodiment comprises the Hexacomb® material previously described.

Figure 56:
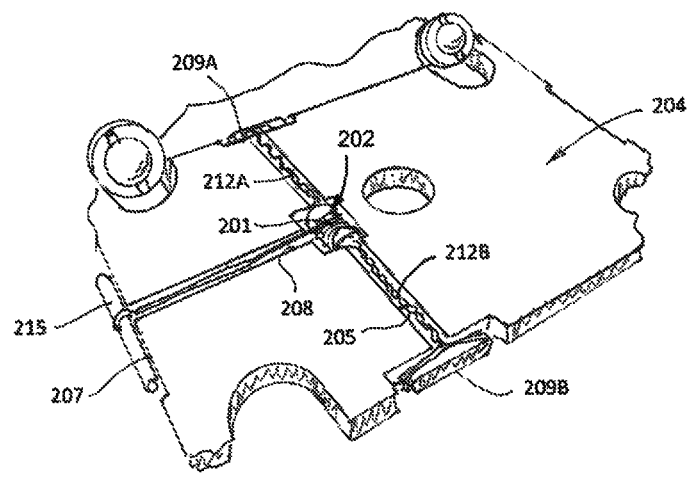
FIG. 56 is a top isometric view of the honeycomb platform and retractable tow strap assembled thereto.
Figure 57:
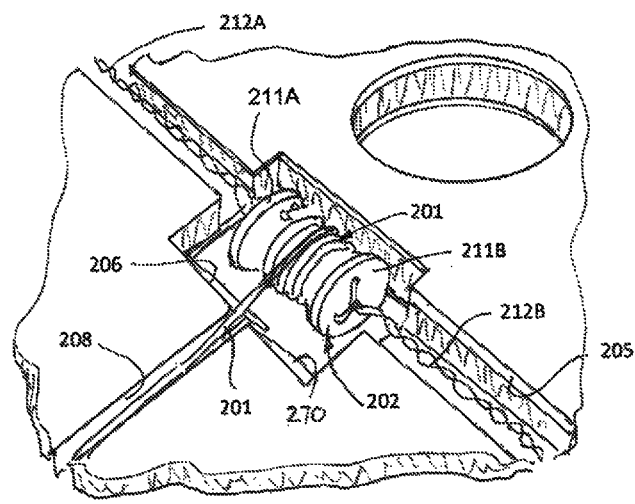
FIG. 57 is a greatly enlarged fragmentary top isometric view of the spool on which the retractable lanyard is wound, and the elastic torsion spring that rotates the spool to retract the lanyard.
Figure 58:
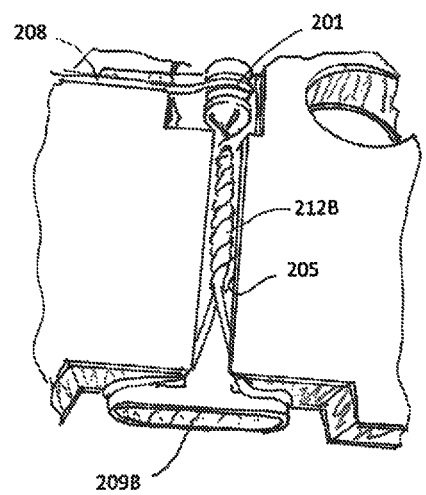
FIG. 58 is a greatly enlarged fragmentary top isometric view showing one end of the elastic spring connected with a mounting structure on the honeycomb platform.
Figure 59:
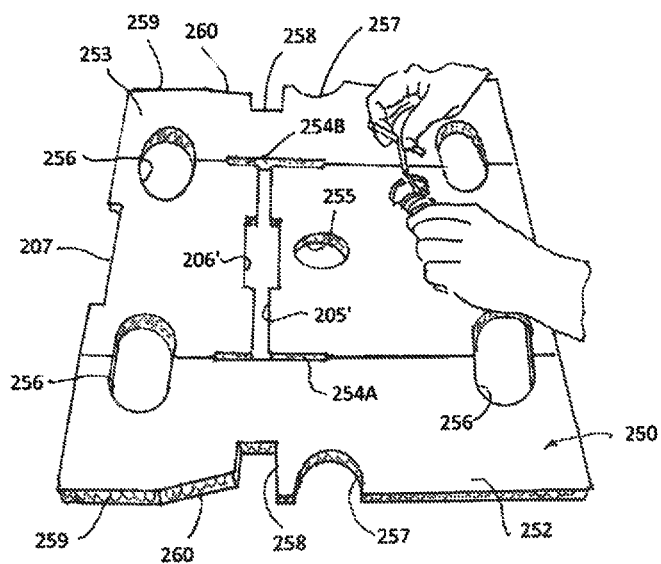
FIG. 59 is a top isometric view of an alternate embodiment wherein the wheel assembly platform comprises hinged panels constructed to retain a retractable tow strap in place on the platform, with the platform shown from the bottom side and in unfolded position in this figure and a retractable tow strap about to be positioned in cutouts in the platform.
Figure 60:
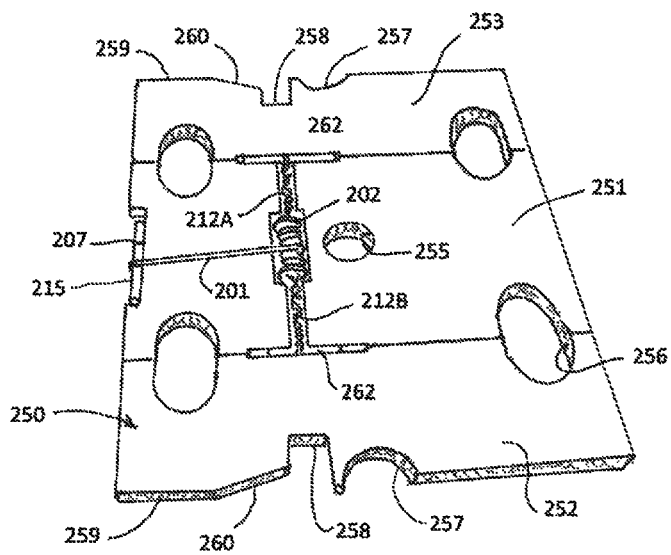
FIG. 60 is a top isometric view showing the hinged platform of FIG. 59 after the retractable tow strap has been positioned in the cutouts but before the hinged panels are folded inwardly over the main panel.
Figure 61:
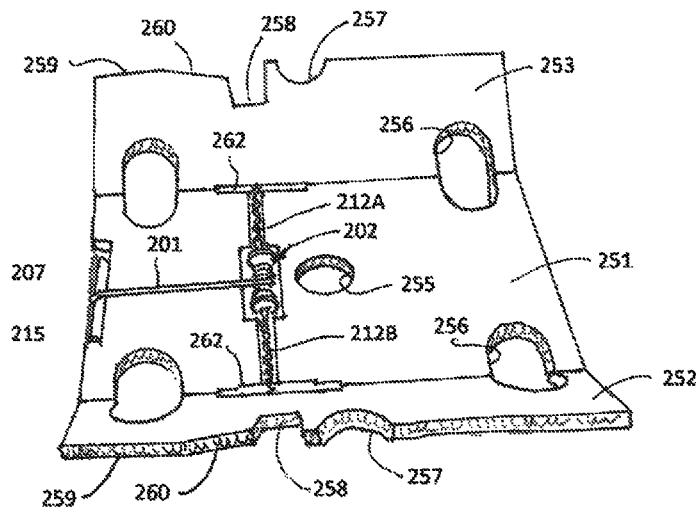
FIG. 61 shows the platform of FIG. 59 with the hinged half panels being folded inwardly over the main panel.

Thus, with particular reference to FIGS. 56-58, a transverse slot 205 is made in the top surface of the platform 204, with an enlarged cutout 206 at the midportion of the slot. One end edge of the platform has a recess 207 formed therein, and a longitudinal slot 208 extends from the cutout 206 to a midportion of the recess 207. Opposite side edges of the platform are cut to form outwardly protruding stubs or pegs 209A and 209B, respectively.

As seen best in FIGS. 53, 54, 57 and 58, the spool 202 comprises a central shaft 210 with radially enlarged hubs 211A and 211B on opposite ends. A central bore 212 extends axially through the spool from one end through the other, and small holes 213A, 213B and 214A, 214B are formed through the base of the respective hubs on diametrically opposite sides thereof closely adjacent the outer diameter of the shaft 210. In the particular example shown, the torsion spring 203 comprises a rubber band. The rubber band is passed through the bore 212 so that loops 212A, 212B project from respective opposite ends of the spool. One end of the cord 201 is then passed outwardly through the hole 213A, through the adjacent loop 212A of the rubber band, back through the other hole 213B and across to the other end of the spool where the cord is passed outwardly through hole 214A, through the adjacent loop 212B, and back through the other hole 214B. The end is then knotted to prevent it from being retracted back through the respective holes.

In use, the spool is placed in the cutout 206, with the loops 212A and 212B of the rubber band lying in the slot 205 and the cord 210 lying in the slot 208. Outer ends of the loops 212A and 212B of the rubber band are then placed over respective stubs or pegs 208 and 209, and the cord is wound onto the spool so that the handle 215 attached to its outer end lies in the recess 207 in the edge of the platform. Preferably, the torsion spring is at least partially twisted to pre-load it when the cord 201 is fully wound on the spool.

In the retractable embodiment of FIGS. 52-58, the tow strap or lanyard is automatically retracted to a stowed position when not in use.

A further embodiment is shown in FIGS. 59-64, wherein the wheel assembly platform 250 comprises a main panel 251 and half panels 252 and 253 hinged to respective opposite side edges thereof. A die-cut opening 205' extends across the width of the main panel, terminating at its midportion in an enlarged area 206' and at its opposite ends in narrow slots 254A and 254B at opposite side edges of the main panel. A circular wheel receiving opening 255 is made in the center of the main panel 251, adjacent the enlarged area 206', and oval shaped openings 256 are made across the hinged connection between the main panel and the half panels adjacent opposite ends of the half panels.

A semi-circular cutout 257 is made in the outer edge of each half panel midway along its length, and rectangular notches or cutouts 258 are made adjacent the cutouts 257. When the half panels are folded inwardly over the main panel the semi-circular cutouts 257 are in aligned registry with the wheel opening 255, and the rectangular cutouts 258 are in aligned registry with the enlarged area 206'.

Figure 62:
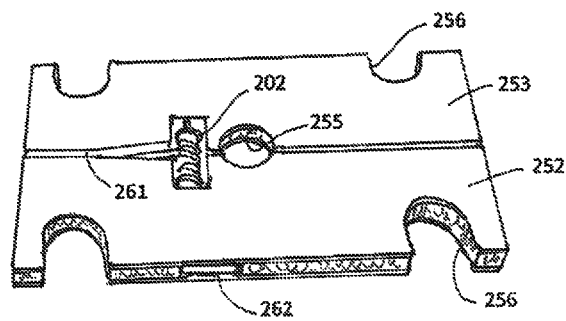
FIG. 62 shows the half panels folded inwardly over the main panel into operative position retaining the elastic means in position in their cutouts.
Figure 63:
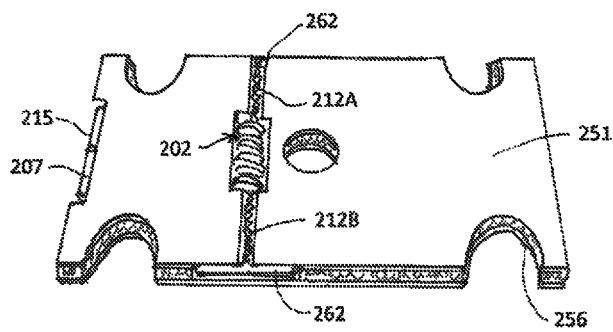
FIG. 63 is a top isometric view of the fully folded wheel assembly platform of FIG. 59.
Figure 64:
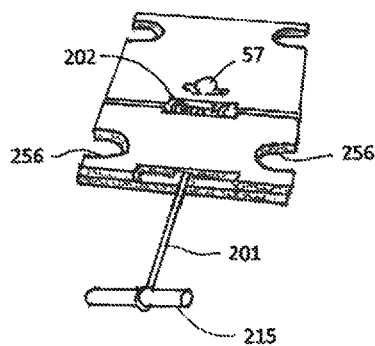
FIG. 64 is a top isometric front end view of the wheel assembly platform of FIG. 63, showing the tow strap being extended from the forward end of the platform.
Figure 65:
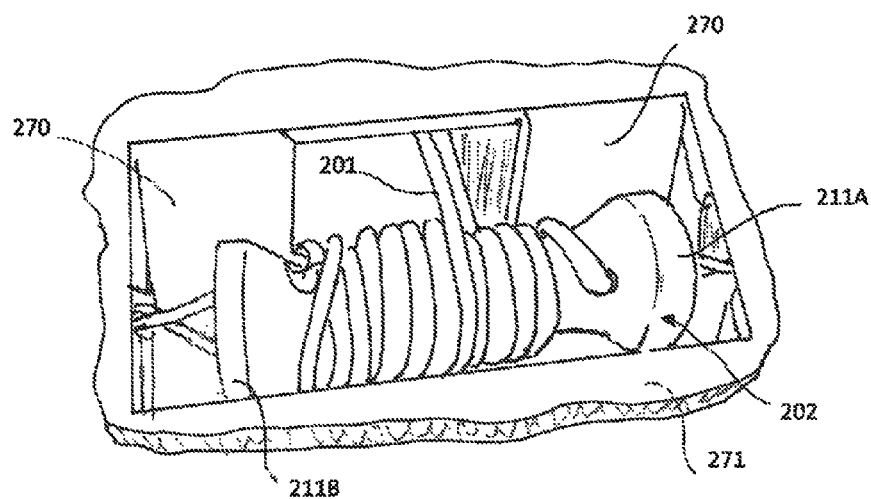
FIG. 65 is an enlarged fragmentary top isometric view of a spool and retractable tow strap in place in the wheel assembly platform, showing die-cut flaps on the top liner board that are folded down so that when the liner board is placed on top of the honeycomb layer the die-cut flaps hang down in front of the spool and provide surfaces against which the ends of the spool can rotate as the tow strap is extended.
Figure 66:
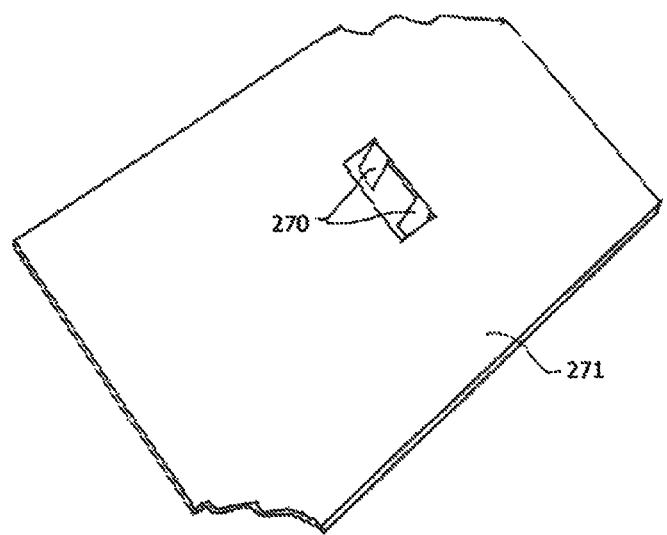
FIG. 66 is a top isometric view of the liner board, showing the die-cut flaps.
Figure 67:
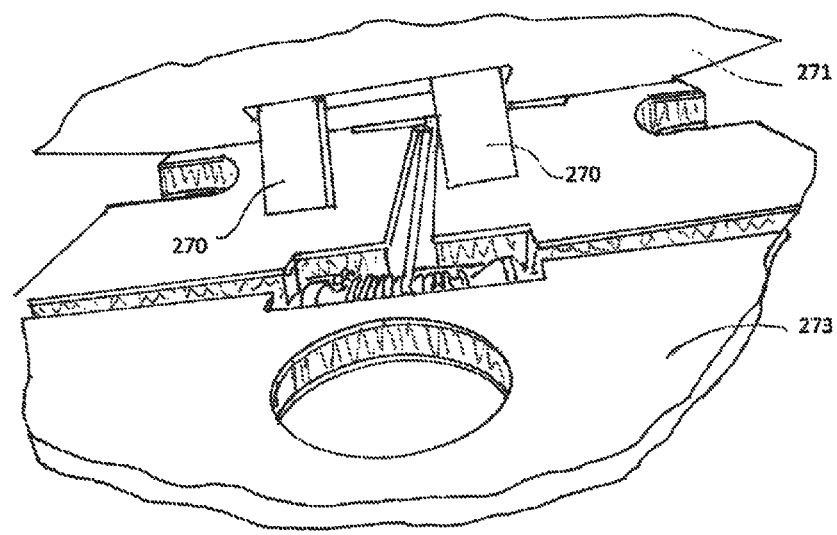
FIG. 67 is a fragmentary exploded view of the honeycomb layer and top liner board being positioned so that the die-cut flaps will extend in front of the ends of the spool.
Figure 68:
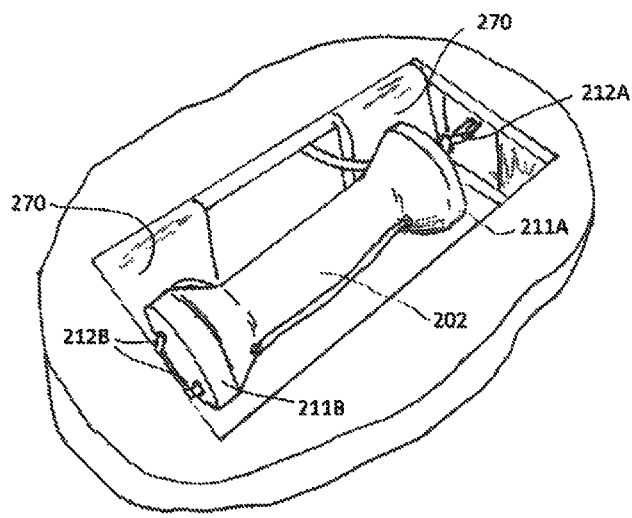
FIG. 68 is an enlarged fragmentary top isometric view similar to FIG. 65, showing the tow strap unwound from the spool.
Figure 69:
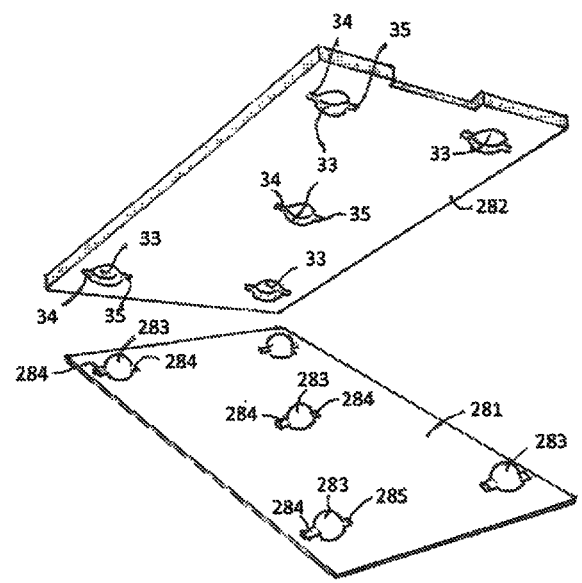
FIG. 69 is an exploded isometric view of a honeycomb panel and thermoform skin panel that are assembled to form a wheel assembly platform according to another embodiment of the invention.
Figure 70:
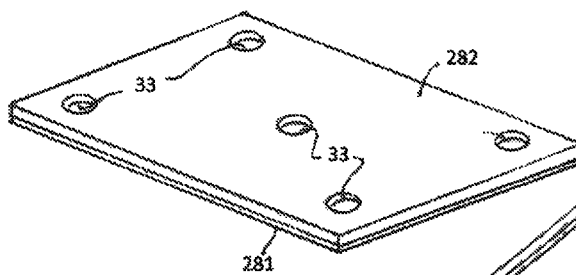
FIG. 70 is a top isometric view of the honeycomb panel and thermoform skin panel assembled together in operative relationship.
Figure 71:
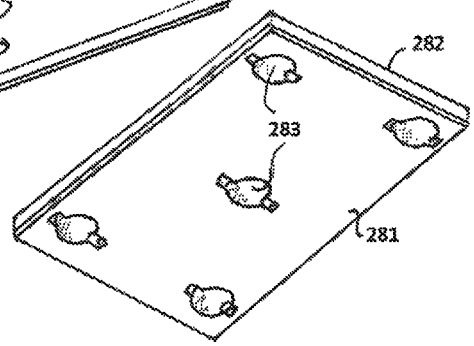
FIG. 71 is a bottom isometric view of the honeycomb panel and thermoform skin panel assembled together in operative relationship.
Figure 72:
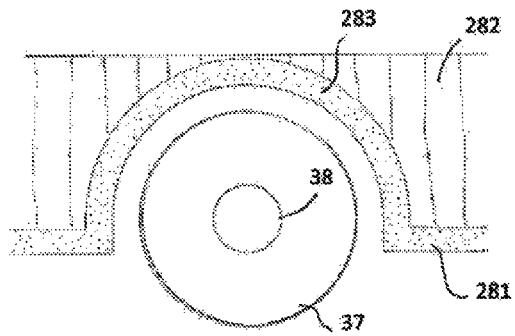
FIG. 72 is a fragmentary sectional view taken along line 72-72 in FIG. 70, but showing a wheel in operative position on the wheel assembly platform.

A portion of the outer edge of each half panel is cut away to define a recessed edge 259 leading from each rectangular cutout 258 to the forward end of the respective half panel and the end of each recessed edge adjacent a respective cutout 258 is angled at 260. When the half panels are folded inwardly over the main panel as shown in FIG. 62, the recessed edges define a channel 261 leading from the enlarged area 206' to the forward edge of the platform, with the angled portions 260 defining a tapered lead-in area from the enlarged area to the channel 261. A forward edge of the main panel is recessed at 207 in alignment with the enlarged area 206' and the channel 261.

A retractable lanyard 201 wound on a spool 202 torsionally biased by elastic members 212A and 212B as in the previous embodiment is assembled to the wheel assembly platform 250. Pins 262 are attached to the outer ends of the elastic members, and a handle 215 is attached to the outer end of the lanyard 201. The retractable lanyard is assembled to the platform by placing the spool 202 in the central enlarged area 206', stretching the elastic members outwardly and placing the pins 262 in the slots 254A and 254B, and pulling the lanyard forwardly and placing the handle 215 in the recess 207. The half panels are then folded inwardly to retain the elastic members, pins, and handle in their respective positions.

FIGS. 65-68 depict a preferred construction in which flaps 270 are die-cut from the top liner board 271 of the wheel assembly platform and folded downwardly in front of the ends 211A and 211B of the spool to provide surfaces against which the ends of the spool can rotate when the tow strap is being withdrawn to prevent the ends of the spool from digging into the honeycomb layer 273.

Figure 73:
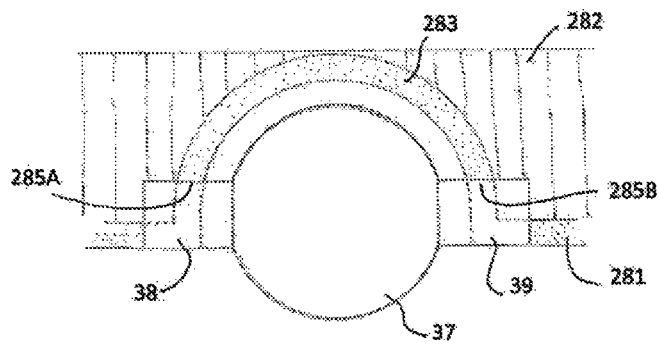
FIG. 73 is a fragmentary sectional view taken along line 73-73 in FIG. 70, but showing a wheel in operative position on the wheel assembly platform.
Figure 74:
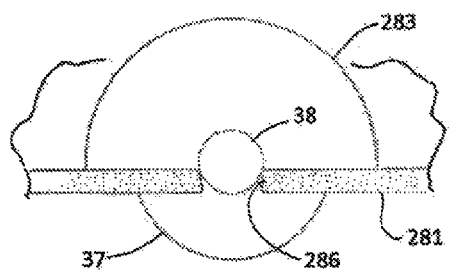
FIG. 74 is a fragmentary sectional view taken along line 74-74 in FIG. 70, but showing a wheel in operative position on the wheel assembly platform.
Figure 75:
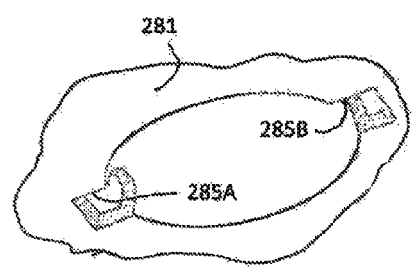
FIG. 75 is a fragmentary bottom isometric view of the platform with the thermoformed skin applied to the bottom surface of the honeycomb panel and prior to wheels being mounted to the platform.

Another embodiment is indicated generally at 280 in FIGS. 69-75. In this embodiment a thermoformed plastic skin 281 is applied to the underside of the honeycomb panel 282. As in previous embodiments, the panel 282 has cutouts 33 for receiving rollers 37 and cutouts 34 and 35 on opposite sides of the cutouts 33 for receiving axles 38 and 39 on the rollers. See, e.g., FIG. 6. The thermoformed skin 281 is shaped with semi-spherical domes 283 that project into the cutouts 33, and semi-cylindrical extensions 284 that fit into the cutouts 34 and 35. As seen best in FIGS. 72-75, notches 285A and 285B are cut into the skin in aligned registry with the cutouts 34 and 35. The opening 286 leading from the bottom of the skin into the respective notches is narrower than the diameter of the axles 38 and 39, whereby when a roller 37 is assembled to the platform as shown in FIGS. 73 and 74, the axles are frictionally retained in the notches.

In addition to serving to hold the rollers assembled to the platform, the skin 281 protects the platform and the contents of the container from water when the container is placed on a wet surface.

Instead of laminating a skin to a honeycomb panel, the skin may be made thicker to accommodate the wheel assemblies and the honeycomb panel omitted (not shown).

Figures 76, 77:
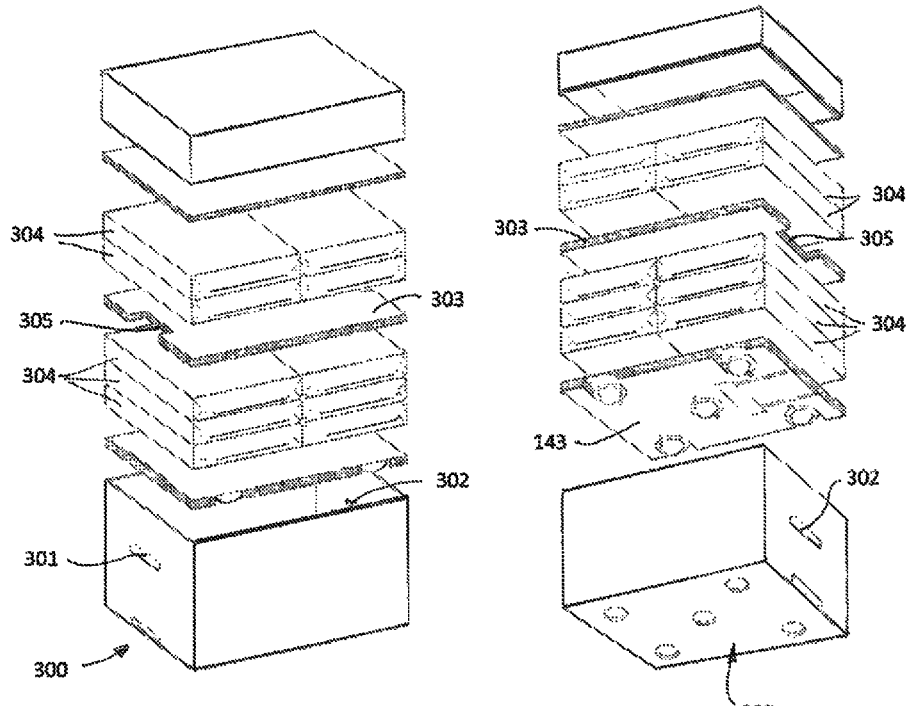
FIG. 76 is a top isometric exploded view of an alternate embodiment wherein hand holes are provided in opposite ends of the carton and a spacer panel with cut outs in its opposite ends is inserted in the carton to provide clearance for fingers inserted through the hand holes so that lifting force can be exerted against the superjacent reams of paper when the carton is lifted by inserting fingers through the hand holes.
FIG. 77 is a bottom isometric exploded view of the embodiment of FIG. 76.
Figure 78:
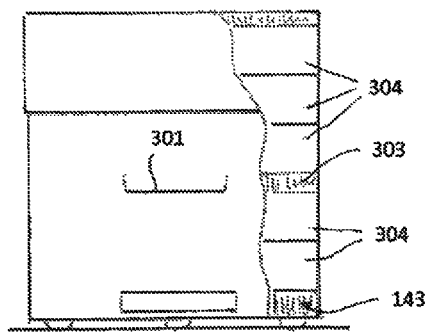
FIG. 78 is an enlarged end view in elevation, with portions shown in section, of a carton having a wheel assembly and tow strap according to any of the forms of the invention, and including the spacer panel and hand holes of the embodiment shown in FIGS. 76 and 77.

Yet another embodiment of the invention is shown in FIGS. 76-78, wherein the carton 300 has hand holes 301, 302 cut in its opposite ends and a spacer panel 303 is inserted in the carton between the layers of reams of paper 304. A recess 305 is formed in each end of the panel 303 and the panel is positioned so that these recesses are in registry with the hand holes 301, 302. The recesses provide access for inserting the fingers through the hand holes so that lifting force can be exerted against the superjacent reams of paper to lift the carton. The panel 303 can comprise a sheet of honeycomb material or other material to provide the necessary space for inserting the fingers.

Figure 79:
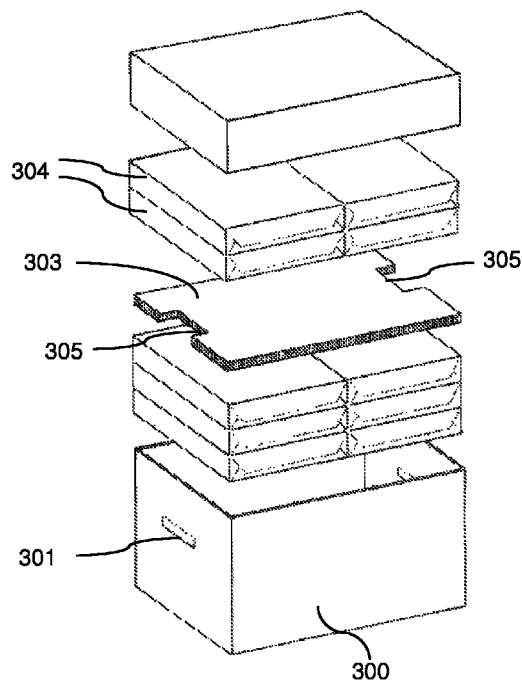
FIG. 79 is a top isometric exploded view of an alternate embodiment wherein the wheel assembly is omitted, the carton is provided with hand holes in its opposite ends, and a spacer panel with cut outs in its opposite ends is inserted in the carton to facilitate lifting of the carton.
Figure 80:
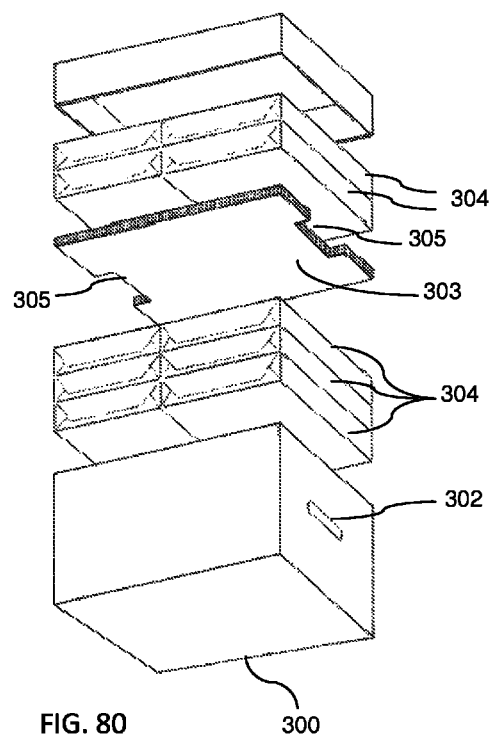
FIG. 80 is a bottom isometric exploded view of the carton of FIG. 79.
Figure 81:
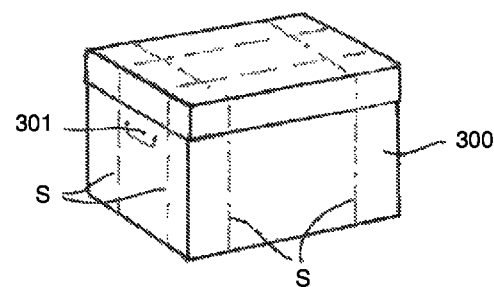
FIG. 81 is a top isometric view of the carton of FIGS. 79 and 80 shown in its shipping configuration with straps applied around the carton.

FIGS. 79-81 depict an embodiment wherein the wheel assembly of the previous embodiments is omitted. This form of the invention provides a carton with hand holes 301, 302 and a panel insert 303 with recesses 305 in its opposite ends to provide space for inserting the fingers through the hand holes to facilitate lifting the carton. When the carton contains reams of paper 304, the spacer panel provides space for inserting the fingers between the reams of paper so that lifting force can be exerted against superjacent reams to lift the carton. Tie straps S may be placed longitudinally and/or transversely around the carton, as shown in broken lines in FIG. 81.

As used herein, the term "roller" or "rollers" is intended to encompass wheels or other devices that support an object for rolling movement on a surface.

While particular embodiments of the invention have been illustrated and described in detail herein, it should be understood that various changes and modifications may be made in the invention without departing from the spirit and intent of the invention as defined by the appended claims.

What is claimed is:

1. A carton structure for cut sheets of paper, wherein said carton structure comprises:

a bottom wall, opposite side walls, and opposite end walls defining a carton;

a wheel assembly mounted to said carton bottom wall, said wheel assembly including a plurality of rollers projecting downwardly from said carton bottom wall to support said carton above a supporting surface and enable said carton to be easily moved along said supporting surface on said rollers; and at least one tow strap connected to said carton to enable a person to pull said carton along said supporting surface, said at least one tow strap having a stowed position in said carton and an extended position with one end of said at least one tow strap extended outside said carton, wherein said carton bottom wall having a plurality of cutouts therein;

said rollers project downwardly through said cutouts in said carton bottom wall;

said wheel assembly includes a roller support platform positioned on top of said carton bottom wall, said roller support platform having cutouts in which said rollers are received and supported;

said roller support platform has recess means formed in one surface thereof;

said at least one tow strap is received in said recess means and attached at an inner end thereof to said roller support platform; and said recess means comprises an enlarged pocket in which said at least one tow strap is folded and stored, and at least one channel extending from said enlarged pocket and opening through one edge of said roller support platform, said at least one tow strap leading from said enlarged pocket and through said channel to outside said carton.

2. The carton of claim 1, wherein said at least one tow strap comprises a single tow strap formed as a closed loop, one closed end of said closed loop being received in said enlarged pocket and another end of said closed loop being outside said carton.

3. The carton of claim 1, wherein said cutouts in said roller support platform comprise circular cutouts extending through a thickness of said roller support platform and a pair of diametrically opposed recesses in an underside of said roller support platform, said diametrically opposed recesses extending radially outwardly from opposite sides of each circular cutout, said diametrically opposed recesses being formed only partially through said thickness of said roller support platform.

4. The carton of claim 1, wherein said cutouts in said roller support platform comprise circular cutouts extending through a thickness of said roller support platform and a pair of diametrically opposed recesses in an underside of said roller support platform, said diametrically opposed recesses extending radially outwardly from opposite sides of each circular cutout, said diametrically opposed recesses being formed only partially through said thickness of said roller support platform; and said rollers each comprise a spherical ball with a cylindrical axle projecting from each of two diametrically opposite sides thereof, wherein said spherical balls are rotatably received in respective ones of said circular cutouts, and said cylindrical axles projecting therefrom are rotatably supported in respective ones of said diametrically opposed recesses, and wherein said circular cutouts and associated ones of said rollers are positioned so that said circular cutouts and said associated ones of said rollers are in aligned registry with said cutouts in said carton bottom wall of said carton.

5. The carton of claim 1, wherein said carton has an open top, and a cover is positioned on and closes said open top, said cover having a plurality of recesses or dimples in a top surface thereof to receive rollers projecting from a superjacent carton when said carton and said superjacent carton are stacked on top of one another, whereby a bottom of said superjacent carton rests on a top of said carton.

6. The carton of claim 1, wherein said roller support platform has said recess means formed in a bottom surface thereof.

7. The carton of claim 1, wherein an upper wheel assembly pad is placed on top of said roller support platform to provide said wheel assembly with a smooth upper surface; and a lower wheel assembly pad is placed on an underside of said roller support platform to help hold said at least one tow strap in place in said recess means.

8. The carton of claim 1, wherein an upper wheel assembly pad is placed on top of said roller support platform to provide said wheel assembly with a smooth upper surface.

9. The carton of claim 1, wherein a lower wheel assembly pad is placed on an underside of said roller support platform to help hold said at least one tow strap in place in said recess means.

10. The carton of claim 1, wherein said at least one tow strap comprises a single tow strap.

11. The carton of claim 1, wherein said cutouts in said roller support platform extend through said roller support platform from a top surface through a bottom surface thereof;

short, rigid, roller support cylinders are glued in said cutouts in said roller support platform, said roller support cylinders having an upper end substantially flush with said top surface of said roller support platform, and a lower end substantially flush with said lower surface of said roller support platform; and said rollers are mounted in and supported by said roller support cylinders.

12. The carton of claim 1, wherein said cutouts in said roller support platform extend through said roller support platform from a top surface through a bottom surface thereof.

13. The carton of claim 1, wherein said rollers comprise spherical balls.

14. The carton of claim 1, wherein said rollers comprise wheels.

15. The carton of claim 1, wherein said roller support platform comprises a panel of honeycomb material.

16. The carton of claim 1, wherein all components of said carton except for said at least one tow strap are made of paper material and can be single streamed into an old corrugated container (OCC) reclamation process.

17. The carton of claim 1, wherein said roller support platform is made of corrugated material having a honeycomb core.

18. The carton of claim 1, wherein said roller support platform comprises areas that are cut away to reduce weight.

19. The carton of claim 1, further comprising hand holes in said opposite end walls through which fingers may be inserted for lifting said carton; and a spacer panel inserted in said carton between layers of said cut sheets of paper, said spacer panel having a recess in each end thereof in registry with said hand holes to provide space for inserting said fingers between said cut sheets of paper to facilitate lifting said carton.

20. A carton structure for cut sheets of paper, wherein said carton structure comprises:

a bottom wall, opposite side walls, and opposite end walls defining a carton;

a wheel assembly mounted to said carton bottom wall, said wheel assembly including a plurality of rollers projecting downwardly from said carton bottom wall to support said carton above a supporting surface and enable said carton to be easily moved along said supporting surface on said rollers; and at least one tow strap connected to said carton to enable a person to pull said carton along said supporting surface, said at least one tow strap having a stowed position in said carton and an extended position with one end of said at least one tow strap extended outside said carton, wherein said carton bottom wall having a plurality of cutouts therein;

said rollers project downwardly through said cutouts in said carton bottom wall;

said wheel assembly includes a roller support platform positioned on top of said carton bottom wall, said roller support platform having cutouts in which said rollers are received and supported;

said roller support platform has recess means formed in one surface thereof;

said at least one tow strap is received in said recess means;

said recess means comprises an enlarged pocket in which said at least one tow strap is folded and stored, and at least one channel extending from said enlarged pocket and opening through one edge of said roller support platform, said at least one tow strap leading from said enlarged pocket and through said channel to outside said carton;

said at least one tow strap comprises a single tow strap formed as a closed loop, one closed end of said closed loop being received in said enlarged pocket and another end of said closed loop being outside said carton;

said at least one channel comprises two spaced apart channels; and said two spaced apart channels and said enlarged pocket define a raised island that engages said one closed end of said closed loop to prevent withdrawal of said closed loop from said enlarged pocket.

21. The carton of claim 20, wherein said cutouts in said roller support platform comprise circular cutouts extending through a thickness of said roller support platform and a pair of diametrically opposed recesses in an underside of said roller support platform, said diametrically opposed recesses extending radially outwardly from opposite sides of each circular cutout, said diametrically opposed recesses being formed only partially through said thickness of said roller support platform.

22. The carton of claim 20, wherein said cutouts in said roller support platform comprise circular cutouts extending through a thickness of said roller support platform and a pair of diametrically opposed recesses in an underside of said roller support platform, said diametrically opposed recesses extending radially outwardly from opposite sides of each circular cutout, said diametrically opposed recesses being formed only partially through said thickness of said roller support platform; and said rollers each comprise a spherical ball with a cylindrical axle projecting from each of two diametrically opposite sides thereof, wherein said spherical balls are rotatably received in respective ones of said circular cutouts, and said cylindrical axles projecting therefrom are rotatably supported in respective ones of said diametrically opposed recesses, and wherein said circular cutouts and associated ones of said rollers are positioned so that said circular cutouts and said associated ones of said rollers are in aligned registry with said cutouts in said carton bottom wall of said carton.

23. The carton of claim 20, wherein said carton has an open top, and a cover is positioned on and closes said open top, said cover having a plurality of recesses or dimples in a top surface thereof to receive rollers projecting from a superjacent carton when said carton and said superjacent carton are stacked on top of one another, whereby a bottom of said superjacent carton rests on a top of said carton.

24. The carton of claim 20, wherein an upper wheel assembly pad is placed on top of said roller support platform to provide said wheel assembly with a smooth upper surface; and a lower wheel assembly pad is placed on an underside of said roller support platform to help hold said at least one tow strap in place in said recess means.

25. The carton of claim 20, wherein an upper wheel assembly pad is placed on top of said roller support platform to provide said wheel assembly with a smooth upper surface.

26. The carton of claim 20, wherein a lower wheel assembly pad is placed on an underside of said roller support platform to help hold said at least one tow strap in place in said recess means.

27. The carton of claim 20, wherein said cutouts in said roller support platform extend through said roller support platform from a top surface through a bottom surface thereof;

short, rigid, roller support cylinders are glued in said cutouts in said roller support platform, said roller support cylinders having an upper end substantially flush with said top surface of said roller support platform, and a lower end substantially flush with said lower surface of said roller support platform; and said rollers are mounted in and supported by said roller support cylinders.

28. The carton of claim 20, wherein said cutouts in said roller support platform extend through said roller support platform from a top surface through a bottom surface thereof.

29. The carton of claim 20, wherein said rollers comprise spherical balls.

30. The carton of claim 20, wherein said rollers comprise wheels.

31. The carton of claim 20, wherein said roller support platform comprises a panel of honeycomb material.

32. The carton of claim 20, wherein all components of said carton except for said at least one tow strap are made of paper material and can be single streamed into an old corrugated container (OCC) reclamation process.

33. The carton of claim 20, wherein said roller support platform is made of corrugated material having a honeycomb core.

34. The carton of claim 20, wherein said roller support platform comprises areas that are cut away to reduce weight.

35. The carton of claim 20, further comprising hand holes in said opposite end walls through which fingers may be inserted for lifting said carton; and a spacer panel inserted in said carton between layers of said cut sheets of paper, said spacer panel having a recess in each end thereof in registry with said hand holes to provide space for inserting said fingers between said cut sheets of paper to facilitate lifting said carton.

36. A carton structure for cut sheets of paper, wherein said carton structure comprises:

a bottom wall, opposite side walls, and opposite end walls defining a carton;

a wheel assembly mounted to said carton bottom wall, said wheel assembly including a plurality of rollers projecting downwardly from said carton bottom wall to support said carton above a supporting surface and enable said carton to be easily moved along said supporting surface on said rollers; and at least one tow strap connected to said carton to enable a person to pull said carton along said supporting surface, said at least one tow strap having a stowed position in said carton and an extended position with one end of said at least one tow strap extended outside said carton, wherein
said carton bottom wall having a plurality of cutouts therein;
said rollers project downwardly through said cutouts in said carton bottom wall;
said wheel assembly includes a roller support platform positioned on top of said carton bottom wall, said roller support platform having cutouts in which said rollers are received and supported;
said roller support platform has recess means formed in one surface thereof;
said at least one tow strap is received in said recess means and attached at an inner end thereof to said roller support platform;
said cutouts in said roller support platform comprise circular cutouts extending through a thickness of said roller support platform and a pair of diametrically opposed recesses in an underside of said roller support platform, said diametrically opposed recesses extending radially outwardly from opposite sides of each circular cutout, said diametrically opposed recesses being formed only partially through said thickness of said roller support platform; and
said rollers each comprise a spherical ball with a cylindrical axle projecting from each of two diametrically opposite sides thereof, wherein said spherical balls are rotatably received in respective ones of said circular cutouts, and said cylindrical axles projecting therefrom are rotatably supported in respective ones of said diametrically opposed recesses, and wherein said circular cutouts and associated ones of said rollers are positioned so that said circular cutouts and said associated ones of said rollers are in aligned registry with said cutouts in said carton bottom wall of said carton.

37. The carton of claim 36, wherein said recess means comprises an enlarged pocket in which said at least one tow strap is folded and stored, and at least one channel extending from said enlarged pocket and opening through one edge of said roller support platform, said at least one tow strap leading from said enlarged pocket and through said channel to outside said carton.

38. The carton of claim 36, wherein said at least one tow strap comprises a single tow strap formed as a closed loop:
said recess means comprises an enlarged pocket in which said single tow strap is folded and stored, and at least one channel extending from said enlarged pocket and opening through one edge of said roller support platform, one closed end of said closed loop being received in said enlarged pocket and another end of said closed loop being outside said carton;
said at least one channel comprises two spaced apart channels; and
said two spaced apart channels and said enlarged pocket define a raised island that engages said one closed end of said closed loop to prevent withdrawal of said closed loop from said enlarged pocket.

39. The carton of claim 36, wherein an upper wheel assembly pad is placed on top of said roller support platform to provide said wheel assembly with a smooth upper surface; and
a lower wheel assembly pad is placed on said underside of said roller support platform to help hold said at least one tow strap in place in said recess means.

40. The carton of claim 36, wherein an upper wheel assembly pad is placed on top of said roller support platform to provide said wheel assembly with a smooth upper surface.

41. The carton of claim 36, wherein a lower wheel assembly pad is placed on said underside of said roller support platform to help hold said at least one tow strap in place in said recess means.

42. The carton of claim 36, wherein said at least one tow strap comprises a single tow strap.

43. The carton of claim 36, wherein said roller support platform comprises a panel of honeycomb material.

44. The carton of claim 36, wherein all components of said carton except for said at least one tow strap are made of paper material and can be single streamed into an old corrugated container (OCC) reclamation process.

45. The carton of claim 36, wherein said roller support platform is made of corrugated material having a honeycomb core.

46. The carton of claim 36, wherein said roller support platform comprises areas that are cut away to reduce weight.

47. The carton of claim 36, further comprising hand holes in said opposite end walls through which fingers may be inserted for lifting said carton; and
a spacer panel inserted in said carton between layers of said cut sheets of paper, said spacer panel having a recess in each end thereof in registry with said hand holes to provide space for inserting said fingers between said cut sheets of paper to facilitate lifting said carton.

48. A carton structure for cut sheets of paper, wherein said carton structure comprises:
a bottom wall, opposite side walls, and opposite end walls defining a carton;
a wheel assembly mounted to said carton bottom wall, said wheel assembly including a plurality of rollers projecting downwardly from said carton bottom wall to support said carton above a supporting surface and enable said carton to be easily moved along said supporting surface on said rollers; and
at least one tow strap connected to said carton to enable a person to pull said carton along said supporting surface, said at least one tow strap having a stowed position in said carton and an extended position with one end of said at least one tow strap extended outside said carton, wherein
said carton bottom wall having a plurality of cutouts therein;
said rollers project downwardly through said cutouts in said carton bottom wall;
said wheel assembly includes a roller support platform positioned on top of said carton bottom wall, said roller support platform having cutouts in which said rollers are received and supported;
said roller support platform has recess means formed in one surface thereof;
said at least one tow strap is received in said recess means and attached at an inner end thereof to said roller support platform;
said cutouts in said roller support platform comprise circular cutouts extending through thickness of said roller support platform and a pair of diametrically opposed recesses in an underside of said roller support platform, said diametrically opposed recesses extending radially outwardly from opposite sides of each circular cutout, said diametrically opposed recesses being formed only partially through said thickness of said roller support platform;

said rollers each comprise a spherical ball with a cylindrical axle projecting from each of two diametrically opposite sides thereof, wherein said spherical balls are rotatably received in respective ones of said circular cutouts, and said cylindrical axles projecting therefrom are rotatably supported in respective ones of said diametrically opposed recesses, and wherein said circular cutouts and associated ones of said rollers are positioned so that said circular cutouts and said associated ones of said rollers are in aligned registry with said cutouts in said carton bottom wall of said carton; and said carton has an open top, and a cover is positioned on and closes said open top, said cover having a plurality of recesses or dimples in a top surface thereof to receive rollers projecting from a superjacent carton when said carton and said superjacent carton are stacked on top of one another, whereby a bottom of said superjacent carton rests on a top of said carton.

49. The carton of claim 48, wherein said recess means comprises an enlarged pocket in which said at least one tow strap is folded and stored, and at least one channel extending from said enlarged pocket and opening through one edge of said roller support platform, said at least one tow strap leading from said enlarged pocket and through said channel to outside said carton.

50. The carton of claim 48, wherein said at least one tow strap comprises a single tow strap formed as a closed loop:
    said recess means comprises an enlarged pocket in which said single tow strap is folded and stored, and at least one channel extending from said enlarged pocket and opening through one edge of said roller support platform, one closed end of said loop being received in said enlarged pocket and another end of said closed loop being outside said carton;
    said at least one channel comprises two spaced apart channels; and
    said two spaced apart channels and said enlarged pocket define a raised island that engages said one closed end of said closed loop to prevent withdrawal of said closed loop from said enlarged pocket.

51. The carton of claim 48, wherein an upper wheel assembly pad is placed on top of said roller support platform to provide said wheel assembly with a smooth upper surface; and
    a lower wheel assembly pad is placed on said underside of said roller support platform to help hold said at least one tow strap in place in said recess means.

52. The carton of claim 48, wherein an upper wheel assembly pad is placed on top of said roller support platform to provide said wheel assembly with a smooth upper surface.

53. The carton of claim 48, wherein a lower wheel assembly pad is placed on said underside of said roller support platform to help hold said at least one tow strap in place in said recess means.

54. The carton of claim 48, wherein said at least one tow strap comprises a single tow strap.

55. The carton of claim 48, wherein said roller support platform comprises a panel of honeycomb material.

56. The carton of claim 48, wherein all components of said carton except for said at least one tow strap are made of paper material and can be single streamed into an old corrugated container (OCC) reclamation process.

57. The carton of claim 48, wherein said roller support platform is made of corrugated material having a honeycomb core.

58. The carton of claim 48, wherein said roller support platform comprises areas that are cut away to reduce weight.

59. The carton of claim 48, further comprising hand holes in said opposite end walls through which fingers may be inserted for lifting said carton; and
    a spacer panel inserted in said carton between layers of said cut sheets of paper, said spacer panel having a recess in each end thereof in registry with said hand holes to provide space for inserting said fingers between said cut sheets of paper to facilitate lifting said carton.

60. A carton structure for cut sheets of paper, wherein said carton structure comprises:
    a bottom wall, opposite side walls, and opposite end walls defining a carton;
    a wheel assembly mounted to said carton bottom wall, said wheel assembly including a plurality of rollers projecting downwardly from said carton bottom wall to support said carton above a supporting surface and enable said carton to be easily moved along said supporting surface on said rollers; and
    at least one tow strap connected to said carton to enable a person to pull said carton along said supporting surface, said at least one tow strap having a stowed position in said carton and an extended position with one end of said at least one tow strap extended outside said carton, wherein
        said carton bottom wall having a plurality of cutouts therein;
        said rollers project downwardly through said cutouts in said carton bottom wall;
        said wheel assembly includes a roller support platform positioned on top of said carton bottom wall, said roller support platform having cutouts in which said rollers are received and supported;
        said roller support platform has recess means formed in one surface thereof;
        said at least one tow strap is received in said recess means and attached at an inner end thereof to said roller support platform;
        said cutouts in said roller support platform comprise circular cutouts extending through thickness of said roller support platform and a pair of diametrically opposed recesses in an underside of said roller support platform, said diametrically opposed recesses extending radially outwardly from opposite sides of each circular cutout, said diametrically opposed recesses being formed only partially through said thickness of said roller support platform;
        said rollers each comprise a spherical ball with a cylindrical axle projecting from each of two diametrically opposite sides thereof, wherein said spherical balls are rotatably received in respective ones of said circular cutouts, and said cylindrical axles projecting therefrom are rotatably supported in respective ones of said diametrically opposed recesses, and wherein said circular cutouts and associated ones of said rollers are positioned so that said circular cutouts and said associated ones of said rollers are in aligned registry with said cutouts in said carton bottom wall of said carton; and
        said roller support platform has said recess means formed in a bottom surface thereof.

61. The carton of claim 60, wherein said at least one tow strap comprises a single tow strap formed as a closed loop:
    said recess means comprises an enlarged pocket in which said single tow strap is folded and stored, and at least one channel extending from said enlarged pocket and opening through one edge of said roller support platform, one closed end of said closed loop being received in said enlarged pocket and another end of said closed loop being outside said carton;

said at least one channel comprises two spaced apart channels; and said two spaced apart channels and said enlarged pocket define a raised island that engages said one closed end of said closed loop to prevent withdrawal of said closed loop from said enlarged pocket.

62. The carton of claim 60, wherein said roller support platform comprises a panel of honeycomb material.

63. The carton of claim 60, wherein all components of said carton except for said at least one tow strap are made of paper material and can be single streamed into an old corrugated container (OCC) reclamation process.

64. The carton of claim 60, wherein said roller support platform is made of corrugated material having a honeycomb core.

65. The carton of claim 60, wherein said roller support platform comprises areas that are cut away to reduce weight.

66. The carton of claim 60, further comprising hand holes in said opposite end walls through which fingers may be inserted for lifting said carton; and a spacer panel inserted in said carton between layers of said cut sheets of paper, said spacer panel having a recess in each end thereof in registry with said hand holes to provide space for inserting said fingers between said cut sheets of paper to facilitate lifting said carton.

67. A carton structure for cut sheets of paper, wherein said carton structure comprises:

a bottom wall, opposite side walls, and opposite end walls defining a carton;

a wheel assembly mounted to said carton bottom wall, said wheel assembly including a plurality of rollers projecting downwardly from said carton bottom wall to support said carton above a supporting surface and enable said carton to be easily moved along said supporting surface on said rollers; and at least one tow strap connected to said carton to enable a person to pull said carton along said supporting surface, said at least one tow strap having a stowed position in said carton and an extended position with one end of said at least one tow strap extended outside said carton, wherein said carton bottom wall having a plurality of cutouts therein;

said rollers project downwardly through said cutouts in said carton bottom wall;

said wheel assembly includes a roller support platform positioned on top of said carton bottom wall, said roller support platform having cutouts in which said rollers are received and supported;

said roller support platform has recess means formed in one surface thereof;

said at least one tow strap is received in said recess means and attached at an inner end thereof to said roller support platform;

said cutouts in said roller support platform comprise circular cutouts extending through thickness of said roller support platform and a pair of diametrically opposed recesses in an underside of said roller support platform, said diametrically opposed recesses extending radially outwardly from opposite sides of each circular cutout, said diametrically opposed recesses being formed only partially through said thickness of said roller support platform;

said rollers each comprise a spherical ball with a cylindrical axle projecting from each of two diametrically opposite sides thereof, wherein said spherical balls are rotatably received in respective ones of said circular cutouts, and said cylindrical axles projecting therefrom are rotatably supported in respective ones of said diametrically opposed recesses, and wherein said circular cutouts and associated ones of said rollers are positioned so that said circular cutouts and said associated ones of said rollers are in aligned registry with said cutouts in said carton bottom wall of said carton;

said roller support platform has said recess means formed in a bottom surface thereof;

and wherein an upper wheel assembly pad is placed on top of said roller support platform to provide said wheel assembly with a smooth upper surface; and a lower wheel assembly pad is placed on said underside of said roller support platform to help hold said at least one tow strap in place in said recess means.

68. The carton of claim 67, wherein said at least one tow strap comprises a single tow strap.

69. The carton of claim 67, wherein said roller support platform comprises a panel of honeycomb material.

70. The carton of claim 67, wherein all components of said carton except for said tow strap are made of paper material and can be single streamed into an old corrugated container (OCC) reclamation process.

71. The carton of claim 67, wherein said roller support platform is made of corrugated material having a honeycomb core.

72. The carton of claim 67, wherein said roller support platform comprises areas that are cut away to reduce weight.

73. The carton of claim 67, further comprising hand holes in said opposite end walls through which fingers may be inserted for lifting said carton; and a spacer panel inserted in said carton between layers of said cut sheets of paper, said spacer panel having a recess in each end thereof in registry with said hand holes to provide space for inserting said fingers between said cut sheets of paper to facilitate lifting said carton.

74. The carton of claim 67, wherein said upper wheel assembly pad is made of a water resistant material to prevent penetration of moisture into said carton.

75. A carton structure for cut sheets of paper, wherein said carton structure comprises:

a bottom wall, opposite side walls, and opposite end walls defining a carton;

a wheel assembly mounted to said carton bottom wall, said wheel assembly including a plurality of rollers projecting downwardly from said carton bottom wall to support said carton above a supporting surface and enable said carton to be easily moved along said supporting surface on said rollers; and at least one tow strap connected to said carton to enable a person to pull said carton along said supporting surface, said at least one tow strap having a stowed position in said carton and an extended position with one end of said at least one tow strap extended outside said carton, wherein said carton bottom wall having a plurality of cutouts therein;

said rollers project downwardly through said cutouts in said carton bottom wall;

said wheel assembly includes a roller support platform positioned on top of said carton bottom wall, said roller support platform having cutouts in which said
rollers are received and supported;
said roller support platform has recess means formed in
one surface thereof;
said at least one tow strap is received in said recess
means and attached at an inner end thereof to said
roller support platform;
said cutouts in said roller support platform comprise
circular cutouts extending through thickness of said
roller support platform and a pair of diametrically
opposed recesses in an underside of said roller support platform, said diametrically opposed recesses
extending radially outwardly from opposite sides of
each circular cutout, said diametrically opposed
recesses being formed only partially through said
thickness of said roller support platform;
said rollers each comprise a spherical ball with a cylindrical axle projecting from each of two diametrically
opposite sides thereof, wherein said spherical balls
are rotatably received in respective ones of said circular cutouts, and said cylindrical axles projecting
therefrom are rotatably supported in respective ones
of said diametrically opposed recesses, and wherein
said circular cutouts and associated ones of said rollers are positioned so that said circular cutouts and said
associated ones of said rollers are in aligned registry
with said cutouts in said carton bottom wall of said
carton;
said roller support platform has said recess means
formed in a bottom surface thereof;
and wherein
an upper wheel assembly pad is placed on top of said
roller support platform to provide said wheel assembly with a smooth upper surface; and
a lower wheel assembly pad is placed on said underside
of said roller support platform to help hold said at least
one tow strap in place in said recess means;
said at least one tow strap comprises a single tow strap;
and
said recess means comprises an enlarged pocket in
which said single tow strap is folded and stored, and at
least one channel extending from said enlarged pocket
and opening through one edge of said roller support
platform, said single tow strap leading from said
enlarged pocket and through said channel to outside
said carton.

76. The carton of claim 75, wherein said roller support platform comprises a panel of honeycomb material.

77. The carton of claim 75, wherein all components of said carton except for said at least one tow strap are made of paper material and can be single streamed into an old corrugated container (OCC) reclamation process.

78. The carton of claim 75, wherein said roller support platform is made of corrugated material having a honeycomb core.

79. The carton of claim 75, wherein said roller support platform comprises areas that are cut away to reduce weight.

80. The carton of claim 75, further comprising hand holes in said opposite end walls through which fingers may be inserted for lifting said carton; and
a spacer panel inserted in said carton between layers of said cut sheets of paper, said spacer panel having a recess in each end thereof in registry with said hand holes to provide space for inserting said fingers between said cut sheets of paper to facilitate lifting said carton.

81. The carton of claim 75, wherein said upper wheel assembly pad is made of a water resistant material to prevent penetration of moisture into said carton.

82. A carton structure for cut sheets of paper, wherein said carton structure comprises:
a bottom wall, opposite side walls, and opposite end walls
defining a carton;
a wheel assembly mounted to said carton bottom wall, said
wheel assembly including a plurality of rollers projecting downwardly from said carton bottom wall to support
said carton above a supporting surface and enable said
carton to be easily moved along said supporting surface
on said rollers; and
at least one tow strap connected to said carton to enable a
person to pull said carton along said supporting surface,
said at least one tow strap having a stowed position in
said carton and an extended position with one end of said
at least one tow strap extended outside said carton,
wherein
said carton bottom wall having a plurality of cutouts
therein;
said rollers project downwardly through said cutouts in
said carton bottom wall;
said wheel assembly includes a roller support platform
positioned on top of said carton bottom wall, said
roller support platform having cutouts in which said
rollers are received and supported;
said roller support platform has recess means formed in
one surface thereof;
said at least one tow strap is received in said recess
means;
said cutouts in said roller support platform comprise
circular cutouts extending through thickness of said
roller support platform and a pair of diametrically
opposed recesses in an underside of said roller support platform, said diametrically opposed recesses
extending radially outwardly from opposite sides of
each circular cutout, said diametrically opposed
recesses being formed only partially through said
thickness of said roller support platform;
said rollers each comprise a spherical ball with a cylindrical axle projecting from each of two diametrically
opposite sides thereof, wherein said spherical balls
are rotatably received in respective ones of said circular cutouts, and said cylindrical axles projecting
therefrom are rotatably supported in respective ones
of said diametrically opposed recesses, and wherein
said circular cutouts and associated ones of said rollers are positioned so that said circular cutouts and said
associated ones of said rollers are in aligned registry
with said cutouts in said carton bottom wall of said
carton;
said roller support platform has said recess means
formed in a bottom surface thereof;
and wherein
an upper wheel assembly pad is placed on top of said
roller support platform to provide said wheel assembly with a smooth upper surface; and
a lower wheel assembly pad is placed on said underside
of said roller support platform to help hold said at least
one tow strap in place in said recess means;
said at least one tow strap comprises a single tow strap;
said recess means comprises an enlarged pocket in
which said single tow strap is folded and stored, and at
least one channel extending from said enlarged pocket
and opening through one edge of said roller support platform, said single tow strap leading from said enlarged pocket and through said channel to outside said carton;

said single tow strap is formed as a closed loop, one closed end of said closed loop being received in said enlarged pocket and another end of said closed loop being outside said carton;

said at least one channel comprises two spaced apart channels; and said two spaced apart channels and said enlarged pocket define a raised island that engages said one closed end of said closed loop to prevent withdrawal of said closed loop from said enlarged pocket.

83. The carton of claim 82, wherein said roller support platform comprises a panel of honeycomb material.

84. The carton of claim 82, wherein all components of said carton except for said at least one tow strap are made of paper material and can be single streamed into an old corrugated container (OCC) reclamation process.

85. The carton of claim 82, wherein said roller support platform is made of corrugated material having a honeycomb core.

86. The carton of claim 82, wherein said roller support platform comprises areas that are cut away to reduce weight.

87. The carton of claim 82, further comprising hand holes in said opposite end walls through which fingers may be inserted for lifting said carton; and a spacer panel inserted in said carton between layers of said cut sheets of paper, said spacer panel having a recess in each end thereof in registry with said hand holes to provide space for inserting said fingers between said cut sheets of paper to facilitate lifting said carton.

88. The carton of claim 82, wherein said upper wheel assembly pad is made of a water resistant material to prevent penetration of moisture into said carton.

89. A carton structure for cut sheets of paper, wherein said carton structure comprises:

a bottom wall, opposite side walls, and opposite end walls defining a carton;

a wheel assembly mounted to said carton bottom wall, said wheel assembly including a plurality of rollers projecting downwardly from said carton bottom wall to support said carton above a supporting surface and enable said carton to be easily moved along said supporting surface on said rollers; and at least one tow strap connected to said carton to enable a person to pull said carton along said supporting surface, said at least one tow strap having a stowed position in said carton and an extended position with one end of said at least one tow strap extended outside said carton, wherein said carton bottom wall having a plurality of cutouts therein;

said rollers project downwardly through said cutouts in said carton bottom wall;

said wheel assembly includes a roller support platform positioned on top of said carton bottom wall, said roller support platform having cutouts in which said rollers are received and supported;

said cutouts in said roller support platform extend through said roller support platform from a top surface through a bottom surface thereof;

short, rigid, roller support cylinders are glued in said cutouts in said roller support platform, said roller support cylinders having an upper end substantially flush with said top surface of said roller support platform, and a lower end substantially flush with said lower surface of said roller support platform;

said rollers are mounted in and supported by said roller support cylinders;

two notches are formed in said lower end of each said roller support cylinder, said notches being disposed on diametrically opposite sides of respective ones of said roller support cylinders; and an axle projects from each of two diametrically opposite sides of each said roller, said axles being rotatably supported in respective said notches.

90. The carton of claim 89, wherein said roller support platform comprises a panel of honeycomb material.

91. The carton of claim 89, wherein all components of said carton except for said at least one tow strap are made of paper material and can be single streamed into an old corrugated container (OCC) reclamation process.

92. The carton of claim 89, wherein said roller support platform is made of corrugated material having a honeycomb core.

93. The carton of claim 89, wherein said roller support platform comprises areas that are cut away to reduce weight.

94. The carton of claim 89, further comprising hand holes in said opposite end walls through which fingers may be inserted for lifting said carton; and a spacer panel inserted in said carton between layers of said cut sheets of paper, said spacer panel having a recess in each end thereof in registry with said hand holes to provide space for inserting said fingers between said cut sheets of paper to facilitate lifting said carton.

95. The carton of claim 89, wherein an upper wheel assembly pad is placed on top of said roller support platform to provide said wheel assembly with a smooth upper surface, said upper wheel assembly pad being made of a water resistant material to prevent penetration of moisture into said carton.

96. The carton of claim 89, wherein said roller support platform has recess means formed in one surface thereof;

said at least one tow strap is received in said recess means and attached at an inner end thereof to said roller support platform; and said recess means comprises an enlarged pocket in which said at least one tow strap is folded and stored, and at least one channel extending from said enlarged pocket and opening through one edge of said roller support platform, said at least one tow strap leading from said enlarged pocket and through said channel to outside said carton.

97. The carton of claim 89, wherein said roller support platform has recess means formed in one surface thereof;

said at least one tow strap is received in said recess means and attached at an inner end thereof to said roller support platform;

said recess means comprises an enlarged pocket in which said at least one tow strap is folded and stored, and at least one channel extending from said enlarged pocket and opening through one edge of said roller support platform, said at least one tow strap leading from said enlarged pocket and through said channel to outside said carton;

said at least one tow strap comprises a single tow strap formed as a closed loop, one closed end of said closed loop being received in said enlarged pocket and another end of said closed loop being outside said carton;

said at least one channel comprises two spaced apart channels; and said two spaced apart channels and said enlarged pocket define a raised island that engages said one closed end of said closed loop to prevent withdrawal of said closed loop from said enlarged pocket.

98. A carton structure for cut sheets of paper, wherein said carton structure comprises:
   a bottom wall, opposite side walls, and opposite end walls defining a carton;
   a wheel assembly mounted to said carton bottom wall, said wheel assembly including a plurality of rollers projecting downwardly from said carton bottom wall to support said carton above a supporting surface and enable said carton to be easily moved along said supporting surface on said rollers; and
   at least one tow strap connected to said carton to enable a person to pull said carton along said supporting surface, said at least one tow strap having a stowed position in said carton and an extended position with one end of said at least one tow strap extended outside said carton, wherein
      said carton bottom wall having a plurality of cutouts therein;
      said rollers project downwardly through said cutouts in said carton bottom wall;
      said wheel assembly includes a roller support platform positioned on top of said carton bottom wall, said roller support platform having cutouts in which said rollers are received and supported;
      said cutouts in said roller support platform extend through said roller support platform from a top surface through a bottom surface thereof;
      short, rigid, roller support cylinders are glued in said cutouts in said roller support platform, said roller support cylinders having an upper end substantially flush with said top surface of said roller support platform, and a lower end substantially flush with said lower surface of said roller support platform;
      said rollers are mounted in and supported by said roller support cylinders;
      two notches are formed in said lower end of each said roller support cylinder, said notches being disposed on diametrically opposite sides of respective ones of said roller support cylinders;
      an axle projects from each of two diametrically opposite sides of each said roller, said axles being rotatably supported in respective said notches; and
      said notches are undercut to hold said axles in place in said notches during handling of said wheel assembly.

99. The carton of claim 98, wherein said roller support platform comprises a panel of honeycomb material.

100. The carton of claim 98, wherein all components of said carton except for said at least one tow strap are made of paper material and can be single streamed into an old corrugated container (OCC) reclamation process.

101. The carton of claim 98, wherein said roller support platform is made of corrugated material having a honeycomb core.

102. The carton of claim 98, wherein said roller support platform comprises areas that are cut away to reduce weight.

103. The carton of claim 98, further comprising hand holes in said opposite end walls through which fingers may be inserted for lifting said carton; and
   a spacer panel inserted in said carton between layers of said cut sheets of paper, said spacer panel having a recess in each end thereof in registry with said hand holes to provide space for inserting said fingers between said cut sheets of paper to facilitate lifting said carton.

104. The carton of claim 98, wherein an upper wheel assembly pad is placed on top of said roller support platform to provide said wheel assembly with a smooth upper surface, said upper wheel assembly pad being made of a water resistant material to prevent penetration of moisture into said carton.

105. The carton of claim 98, wherein said roller support platform has recess means formed in one surface thereof;
   said at least one tow strap is received in said recess means and attached at an inner end thereof to said roller support platform; and
   said recess means comprises an enlarged pocket in which said at least one tow strap is folded and stored, and at least one channel extending from said enlarged pocket and opening through one edge of said roller support platform, said at least one tow strap leading from said enlarged pocket and through said channel to outside said carton.

106. The carton of claim 98, wherein said roller support platform has recess means formed in one surface thereof;
   said at least one tow strap is received in said recess means and attached at an inner end thereof to said roller support platform;
   said recess means comprises an enlarged pocket in which said at least one tow strap is folded and stored, and at least one channel extending from said enlarged pocket and opening through one edge of said roller support platform, said at least one tow strap leading from said enlarged pocket and through said channel to outside said carton;
   said at least one tow strap comprises a single tow strap formed as a closed loop, one closed end of said closed loop being received in said enlarged pocket and another end of said closed loop being outside said carton;
   said at least one channel comprises two spaced apart channels; and
   said two spaced apart channels and said enlarged pocket define a raised island that engages said one closed end of said closed loop to prevent withdrawal of said closed loop from said enlarged, pocket.

107. A carton structure for cut sheets of paper, wherein said carton structure comprises:
   a bottom wall, opposite side walls, and opposite end walls defining a carton;
   a wheel assembly mounted to said carton bottom wall, said wheel assembly including a plurality of rollers projecting downwardly from said carton bottom wall to support said carton above a supporting surface and enable said carton to be easily moved along said supporting surface on said rollers; and
   at least one tow strap connected to said carton to enable a person to pull said carton along said supporting surface, said at least one tow strap having a stowed position in said carton and an extended position with one end of said at least one tow strap extended outside said carton, wherein
      said carton bottom wall having a plurality of cutouts therein;
      said rollers project downwardly through said cutouts in said carton bottom wall;
      said wheel assembly includes a roller support platform positioned on top of said carton bottom wall, said roller support platform having cutouts in which said rollers are received and supported;
      said cutouts in said roller support platform extend through said roller support platform from a top surface through a bottom surface thereof;

short, rigid, roller support cylinders are glued in said cutouts in said roller support platform, said cylinders having an upper end substantially flush with said top surface of said roller support platform, and a lower end substantially flush with said lower surface of said roller support platform;

said rollers are mounted in and supported by said roller support cylinders;

two notches are formed in said lower end of each said roller support cylinder, said notches being disposed on diametrically opposite sides of respective ones of said roller support cylinders;

an axle projects from each of two diametrically opposite sides of each said roller, said axles being rotatably supported in respective said notches; and said rollers comprise spherical balls.

108. The carton of claim 107, wherein said roller support platform comprises a panel of honeycomb material.

109. The carton of claim 107, wherein all components of said carton except for said at least one tow strap are made of paper material and can be single streamed into an old corrugated container (OCC) reclamation process.

110. The carton of claim 107, wherein said roller support platform is made of corrugated material having a honeycomb core.

111. The carton of claim 107, wherein said roller support platform comprises areas that are cut away to reduce weight.

112. The carton of claim 107, further comprising hand holes in said opposite end walls through which fingers may be inserted for lifting said carton; and a spacer panel inserted in said carton between layers of said cut sheets of paper, said spacer panel having a recess in each end thereof in registry with said hand holes to provide space for inserting said fingers between said cut sheets of paper to facilitate lifting said carton.

113. The carton of claim 107, wherein an upper wheel assembly pad is placed on top of said roller support platform to provide said wheel assembly with a smooth upper surface, said upper wheel assembly pad being made of a water resistant material to prevent penetration of moisture into said carton.

114. The carton of claim 107, wherein said roller support platform has recess means formed in one surface thereof;

said at least one tow strap is received in said recess means and attached at an inner end thereof to said roller support platform; and said recess means comprises an enlarged pocket in which said at least one tow strap is folded and stored, and at least one channel extending from said enlarged pocket and opening through one edge of said roller support platform, said at least one tow strap leading from said enlarged pocket and through said channel to outside said carton.

115. The carton of claim 107, wherein said roller support platform has recess means formed in one surface thereof;

said at least one tow strap is received in said recess means and attached at an inner end thereof to said roller support platform;

said recess means comprises an enlarged pocket in which said at least one tow strap is folded and stored, and at least one channel extending from said enlarged pocket and opening through one edge of said roller support platform, said at least one tow strap leading from said enlarged pocket and through said channel to outside said carton;

said at least one tow strap comprises a single tow strap formed as a closed loop, one closed end of said closed loop being received in said enlarged pocket and another end of said closed loop being outside said carton;

said at least one channel comprises two spaced apart channels; and said two spaced apart channels and said enlarged pocket define a raised island that engages said one closed end of said closed loop to prevent withdrawal of said closed loop from said enlarged pocket.

116. A carton structure for cut sheets of paper, wherein said carton structure comprises:

a bottom wall, opposite side walls, and opposite end walls defining a carton;

a wheel assembly mounted to said carton bottom wall, said wheel assembly including a plurality of rollers projecting downwardly from said carton bottom wall to support said carton above a supporting surface and enable said carton to be easily moved along said supporting surface on said rollers; and at least one tow strap connected to said carton to enable a person to pull said carton along said supporting surface, said at least one tow strap having a stowed position in said carton and an extended position with one end of said at least one tow strap extended outside said carton, wherein said carton bottom wall having a plurality of cutouts therein;

said rollers project downwardly through said cutouts in said carton bottom wall;

said wheel assembly includes a roller support platform positioned on top of said carton bottom wall, said roller support platform having cutouts in which said rollers are received and supported;

said cutouts in said roller support platform extend through said roller support platform from a top surface through a bottom surface thereof;

short, rigid, roller support cylinders are glued in said cutouts in said roller support platform, said cylinders having an upper end substantially flush with said top surface of said roller support platform, and a lower end substantially flush with said lower surface of said roller support platform;

said rollers are mounted in and supported by said roller support cylinders;

two notches are formed in said lower end of each said roller support cylinder, said notches being disposed on diametrically opposite sides of respective ones of said roller support cylinders;

an axle projects from each of two diametrically opposite sides of each said roller, said axles being rotatably supported in respective said notches; and said rollers comprise wheels.

117. The carton of claim 116, wherein said roller support platform comprises a panel of honeycomb material.

118. The carton of claim 116, wherein all components of said carton except for said at least one tow strap are made of paper material and can be single streamed into an old corrugated container (OCC) reclamation process.

119. The carton of claim 116, wherein said roller support platform is made of corrugated material having a honeycomb core.

120. The carton of claim 116, wherein said roller support platform comprises areas that are cut away to reduce weight.

121. The carton of claim 116, further comprising hand holes in said opposite end walls through which fingers may be inserted for lifting said carton; and a spacer panel inserted in said carton between layers of said cut sheets of paper, said spacer panel having a recess in each end thereof in registry with said hand holes to provide space for inserting said fingers between said cut sheets of paper to facilitate lifting said carton.

122. The carton of claim 116, wherein an upper wheel assembly pad is placed on top of said roller support platform to provide said wheel assembly with a smooth upper surface, said upper wheel assembly pad being made of a water resistant material to prevent penetration of moisture into said carton.

123. The carton of claim 116, wherein said roller support platform has recess means formed in one surface thereof;
   said at least one tow strap is received in said recess means and attached at an inner end thereof to said roller support platform; and
   said recess means comprises an enlarged pocket in which said at least one tow strap is folded and stored, and at least one channel extending from said enlarged pocket and opening through one edge of said roller support platform, said at least one tow strap leading from said enlarged pocket and through said channel to outside said carton.

124. The carton of claim 116, wherein said roller support platform has recess means formed in one surface thereof;
   said at least one tow strap is received in said recess means and attached at an inner end thereof to said roller support platform;
   said recess means comprises an enlarged pocket in which said at least one tow strap is folded and stored, and at least one channel extending from said enlarged pocket and opening through one edge of said roller support platform, said at least one tow strap leading from said enlarged pocket and through said channel to outside said carton;
   said at least one tow strap comprises a single tow strap formed as a closed loop, one closed end of said closed loop being received in said enlarged pocket and another end of said closed loop being outside said carton;
   said at least one channel comprises two spaced apart channels; and
   said two spaced apart channels and said enlarged pocket define a raised island that engages said one closed end of said closed loop to prevent withdrawal of said closed loop from said enlarged pocket.

* * * * *